US012795609B2

(12) United States Patent
Sartori et al.

(10) Patent No.: US 12,795,609 B2
(45) Date of Patent: Nov. 10, 2026

(54) LOW POWER COMMUNICATION ON SIDELINK

(71) Applicant: Huawei Technologies Co., Ltd., Shenzhen (CN)

(72) Inventors: Philippe Sartori, Plainfield, IL (US); Siva Subramani, Arlington Heights, IL (US); Brian Classon, Palatine, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 709 days.

(21) Appl. No.: 17/712,899

(22) Filed: Apr. 4, 2022

(65) Prior Publication Data

US 2022/0232528 A1 Jul. 21, 2022

Related U.S. Application Data

(63) Continuation of application No. PCT/US2020/054133, filed on Oct. 2, 2020.

(Continued)

(51) Int. Cl.

*H04W 72/02* (2009.01)
*H04W 4/46* (2018.01)

(Continued)

(52) U.S. Cl.

CPC ............. *H04W 72/02* (2013.01); *H04W 4/46* (2018.02); *H04W 28/26* (2013.01); *H04W 72/20* (2023.01); *H04W 72/56* (2023.01)

(58) Field of Classification Search

CPC ....... H04W 72/02; H04W 4/46; H04W 72/56; H04W 72/20; H04W 28/26

See application file for complete search history.

(56) References Cited

U.S. PATENT DOCUMENTS 10,880,883 B2 * 12/2020 Bhushan ........... H04W 72/0446
2016/0073408 A1 3/2016 Sartori et al.

(Continued)

FOREIGN PATENT DOCUMENTS

WO 2018028417 A1 2/2018
WO 2018175553 A1 9/2018

OTHER PUBLICATIONS

Ericsson, "Radio resource pool sharing between mode 3 and mode 4 UEs", 3GPP TSG RAN WG1 Meeting #89, R1-1708942, May 15-19, 2017, 4 Pages, Hangzhou, China.

(Continued)

*Primary Examiner* — Michael Thier
*Assistant Examiner* — Nevena Zecevic Sandhu
(74) *Attorney, Agent, or Firm* — Slater Matsil, LLP

(57) ABSTRACT

Example sidelink communication methods and apparatus are described. One example method includes determining resources for potential transmission from a resource pool on a sidelink by a terminal device. The terminal device transmits a resource indication message on the sidelink, where the resource indication message includes a configuration of the resources that are determined for potential transmission. The configuration of the resources indicates a subset of the resources that are usable by first type of user equipments (UEs) and a subset of the resources that are usable by second type of UEs. The resource indication message is sent in a sidelink control information (SCI) message. The terminal device receives an indication of selected resources from at least one second type of UE, and transmits the indication of selected resources to at least another UE.

8 Claims, 15 Drawing Sheets

Related U.S. Application Data

(60) Provisional application No. 62/910,950, filed on Oct. 4, 2019.

(51) Int. Cl.

| | |
|---|---|
| ***H04W 28/26*** | (2009.01) |
| ***H04W 72/20*** | (2023.01) |
| ***H04W 72/56*** | (2023.01) |

(56) References Cited

U.S. PATENT DOCUMENTS

| | | | | |
|---|---|---|---|---|
| 2016/0338094 | A1 | 11/2016 | Faurie et al. | |
| 2018/0199364 | A1* | 7/2018 | Feng | H04W 76/14 |
| 2018/0332585 | A1 | 11/2018 | Faurie et al. | |
| 2018/0376525 | A1 | 12/2018 | Feng | |
| 2019/0045485 | A1* | 2/2019 | Seo | H04W 76/23 |
| 2020/0236655 | A1* | 7/2020 | Bharadwaj | H04W 72/56 |
| 2021/0218511 | A1* | 7/2021 | Zhang | H04L 5/0048 |
| 2021/0314991 | A1* | 10/2021 | Tenny | H04W 4/40 |
| 2022/0086847 | A1* | 3/2022 | Yang | H04W 72/52 |
| 2022/0116995 | A1* | 4/2022 | Lu | H04W 72/04 |
| 2022/0256518 | A1* | 8/2022 | Hou | H04L 1/1825 |
| 2022/0346118 | A1* | 10/2022 | Wu | H04L 1/1825 |

OTHER PUBLICATIONS

Huawei, et al., “On resource pool sharing between R15 UEs and R14 UEs”, 3GPP TSG-RAN WG2 Meeting #99bis, R2-1710088, Oct. 9-13, 2017, 5 Pages, Prague, Czech Republic.

Kyocera, “Sidelink Physical Layer Structure”, 3GPP TSG-RAN WG1#98, R1-1909015, Aug. 26-30, 2019, 7 Pages, Prague, Czech Republic.

Oppo, “Resource pool sharing in eV2x”, 3GPP TSG-RAN2 Meeting #101, R2-1801848, revision of R2-1712180, Feb. 26-Mar. 2, 2018, 4 Pages, Athens, Greece.

ZTE, “Discussion on V2P aspects”, 3GPP TSG-RAN WG2 Meeting #96, R2-168144, Nov. 14-18, 2016, 4 Pages, Reno, USA.

* cited by examiner

LOW POWER COMMUNICATION ON SIDELINK

CROSS-REFERENCE TO RELATED APPLICATIONS

This application is a continuation of International Patent Application No. PCT/US2020/054133 filed on Oct. 2, 2020, which claims priority to U.S. Provisional Application 62/910,950 filed on Oct. 4, 2019, both of which are hereby incorporated herein by reference.

TECHNICAL FIELD

The present disclosure relates to wireless communication, and more specifically to reducing power consumption of communications on sidelink.

BACKGROUND

The third generation partnership project (3GPP) has approved a work item for the standardization of the fifth generation (5G) new radio access technology (NR) vehicle-to-everything (V2X) wireless communication with the goal of providing 5G-compatible high-speed reliable connectivity for vehicular communications for applications such as safety systems and autonomous driving. High data rates, low latencies, and high reliabilities are some of the key areas that are being investigated and standardized. Power consumption is also addressed on the sidelink. For example, the V2X design that uses the sidelink for safety applications can require constant monitoring, which would result in high power consumption. Furthermore, Vehicle to Pedestrian (V2P) applications as specified in 5G's Release-17 (Rel-17) require the V2P operations to be as low power as possible.

Therefore, more efficient ways of conducting communications on sidelink are desirable for reducing the power consumption of various safety applications in V2X communications.

SUMMARY

The present disclosure is directed to methods and systems for reducing power consumption of communications on sidelink. The methods and systems as described can be implemented for vehicle-to-everything (V2X) scenarios in LTE and 5G (new radio) systems.

In a first implementation, a method for reducing power consumption of communications on sidelink includes: determining, by a terminal device, resources for potential transmission from a resource pool on a sidelink; transmitting, by the terminal device, a resource indication message on the sidelink, wherein the resource indication message comprises a configuration of the resources that are determined for potential transmission, wherein the configuration of the resources indicates a subset of the resources that are usable by first type of user equipments (UEs) and a subset of the resources that are usable by second type of UEs, wherein the resource indication message is sent in a sidelink control information (SCI) message; receiving, by the terminal device, an indication of selected resources from at least one second type of UE, wherein the selected resources comprise one or more of the resources that are usable by the at least one second type of UE; and transmitting, by the terminal device, the indication of selected resources to at least another UE.

In a second implementation, an electronic device includes a non-transitory memory storage comprising instructions, and one or more hardware processors in communication with the memory storage, wherein the one or more hardware processors execute the instructions to perform operations including: determining resources for potential transmission from a resource pool on a sidelink; transmitting a resource indication message on the sidelink, wherein the resource indication message comprises a configuration of the resources that are determined for potential transmission, wherein the configuration of the resources indicates a subset of the resources that are usable by first type of user equipments (UEs) and a subset of the resources that are usable by second type of UEs, wherein the resource indication message is sent in a sidelink control information (SCI) message; receiving an indication of selected resources from at least one second type of UE, wherein the selected resources comprise one or more of the resources that are usable by the at least one second type of UE; and transmitting the indication of selected resources to at least another UE.

In a third implementation, a non-transitory computer-readable medium storing computer instructions for reducing power consumption of communications on sidelink, that when executed by one or more hardware processors, cause the one or more hardware processors to perform operations including: determining resources for potential transmission from a resource pool on a sidelink; transmitting a resource indication message on the sidelink, wherein the resource indication message comprises a configuration of the resources that are determined for potential transmission, wherein the configuration of the resources indicate a subset of the resources that are usable by first type of user equipments (UEs) and a subset of the resources that are usable by second type of UEs, wherein the resource indication message is sent in a sidelink control information (SCI) message; receiving an indication of selected resources from at least one second type of UE, wherein the selected resources comprise one or more of the resources that are usable by the at least one second type of UE; and transmitting the indication of selected resources to at least another UE.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION OF ILLUSTRATIVE EMBODIMENTS

The following detailed description describes techniques for reducing power consumptions of sidelink communications and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail inasmuch as such details are within the skill of one of ordinary skill in the art. The present disclosure is not intended to be limited to the described or illustrated implementations, but to be accorded the widest scope consistent with the described principles and features.

Figure 1:
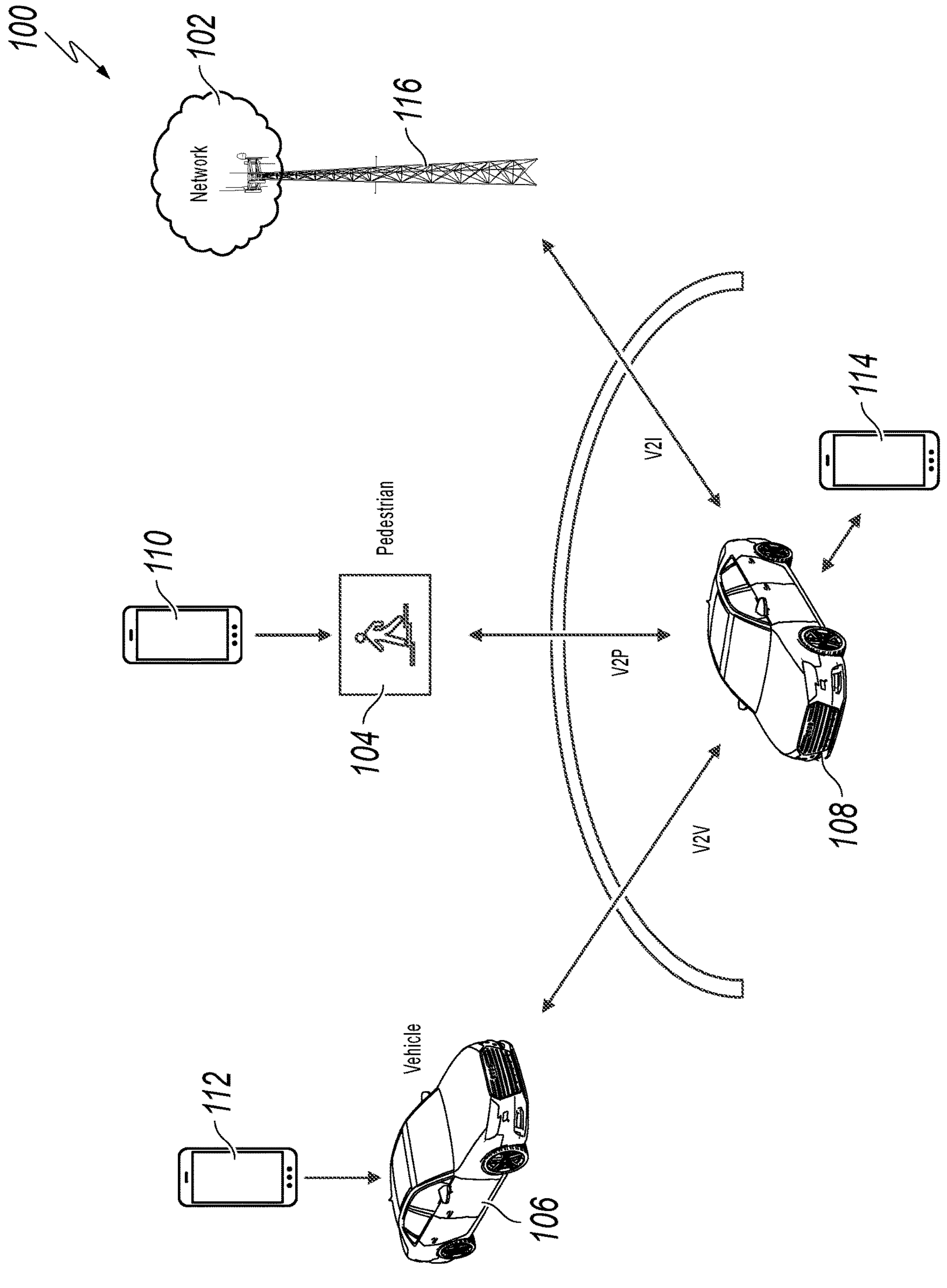
FIG. 1 shows an example of vehicle-to-everything (V2X) communication system according to an implementation.

Vehicle-to-everything (V2X) communications constitute communications on the sidelink between devices such as user equipment (UEs) in addition to downlink and uplink. V2X communications include three types of communications, namely Vehicle to Vehicle (V2V) communication, Vehicle to Pedestrian (V2P), and Vehicle-to-Infrastructure (V2I) communication. FIG. 1 shows an example of V2X communication system 100 according to an implementation. As shown, system 100 includes a UE 100 associate with a user 104 (e.g., a pedestrian), and UEs 106 and 108 associated with vehicles 106 and 108, respectively. In one example, the UEs 106 and 108 may be configured as V2V UEs that are equipped in the vehicles 106 and 108 to perform V2V communication. The UE 110 may be configured as V2P UE to perform V2P communication with a V2V UE (e.g., UE 114). Note that system 100 is shown to include three UEs (i.e., UEs 110, 112, and 114) for illustrative purposes only. The system 100 can include any suitable number of UEs (e.g., V2V UEs and/or V2P UEs).

Turning to a general description of the elements, a user equipment (UE) may be referred to as a mobile electronic device, user device, mobile station, subscriber station, portable electronic device, mobile communications device, wireless modem, or wireless terminal. Examples of a UE (e.g., the UEs 110, 112, and 114) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum.

Other examples of a user device include mobile and fixed electronic devices. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "user device" can also refer to any hardware or software component that can terminate a communication session for a user.

The wireless communication network 102 may include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), LTE Advanced, or 5G. In some instances, the core networks may be evolved packet cores (EPCs).

A RAN is part of a wireless telecommunication system that implements a radio access technology, such as UMTS, CDMA2000, 3GPP LTE, 3GPP LTE-A, and 5G. In many applications, a RAN includes at least one base station (e.g., base station 116). A base station 116 may be a radio base station that may control all or at least some radio-related functions in a fixed part of the system. The base station 116 may provide radio interface within their coverage area or a cell for the UEs 110, 112, and 114 to communicate. The base station 116 may be distributed throughout the cellular network to provide a wide area of coverage. The base station 116 directly communicates to one or a plurality of user devices, other base stations, and one or more core network nodes.

Figure 2:
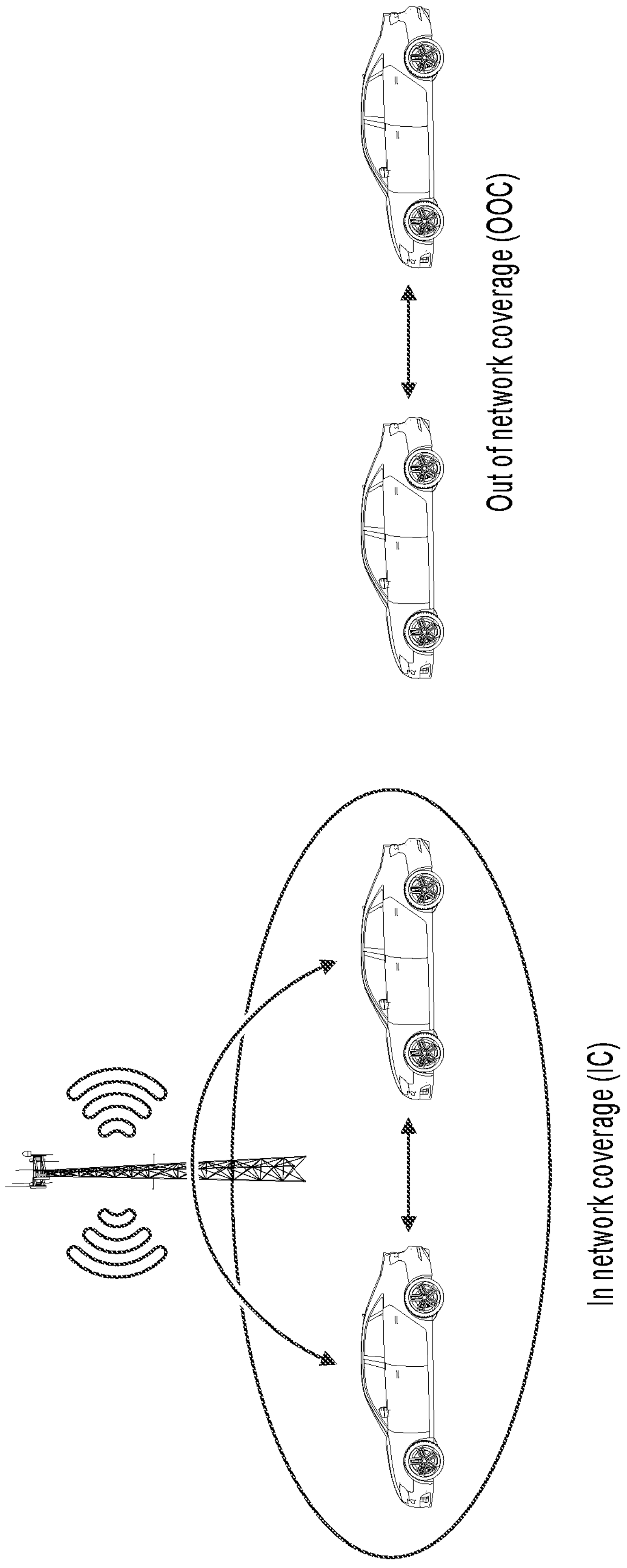
FIG. 2 shows an example of in-coverage and out-of-coverage operations according to an implementation.

In some cases, the V2X communication as described herein can include either in-coverage or out-of-coverage operations. FIG. 2 is a graph showing the in-coverage and out-of-coverage operations. With in-coverage (IC) operation, a central node (e.g., eNodeB, gNodeB) may be present and can be used to manage the sidelink. With out-of-coverage (OOC) operation, the system operations can be fully distributed, and UEs can select resources on their own.

In sidelink communications, the notion of resource pools was introduced for the LTE sidelink, and is being reused for NR sidelink. A resource pool includes a set of resources (e.g., time and frequency) that can be used for sidelink communication. In some cases, resources in a resource pool can be configured for different channels including control channels, shared channels, and feedback channels. In some cases, rules can be defined by standard on how the resources are shared and used for a particular configuration of the resource pool.

In some cases, new radio (NR) sidelink communication may include two modes including mode-1 sidelink communication and mode-2 sidelink communication. In mode-1 sidelink communication, the gNodeB manages the sidelink, e.g., by managing resource allocation, etc. In some cases, the UEs may be expected to receive its resource allocation from the gNodeB in mode-1 sidelink communication, e.g., through a DCI (downlink control information) or a configured grant. In mode-2 sidelink communication, the UEs may autonomously select resources. In some cases, the resources may be selected using sensing in mode-2 sidelink communications. Table 1 shows characteristics of mode-1 and mode-2 sidelink communication.

TABLE 1

Characteristics of mode-1 and mode-2 sidelink communication.

| | Mode-1 | Mode-2 |
|---|---|---|
| Scheduling | Done by gNB | Done by UE (sensing) |
| Spectrum | Shared or dedicated | Shared or dedicated |
| Interference control | Interference is minimized (at the expense of a centralized controller) | Interference is avoided (through sensing) |
| Congestion control | Done by gNB and UE | Done by UE only |
| Synchronization | gNB or GNSS | gNB or GNSS |

Figure 3:
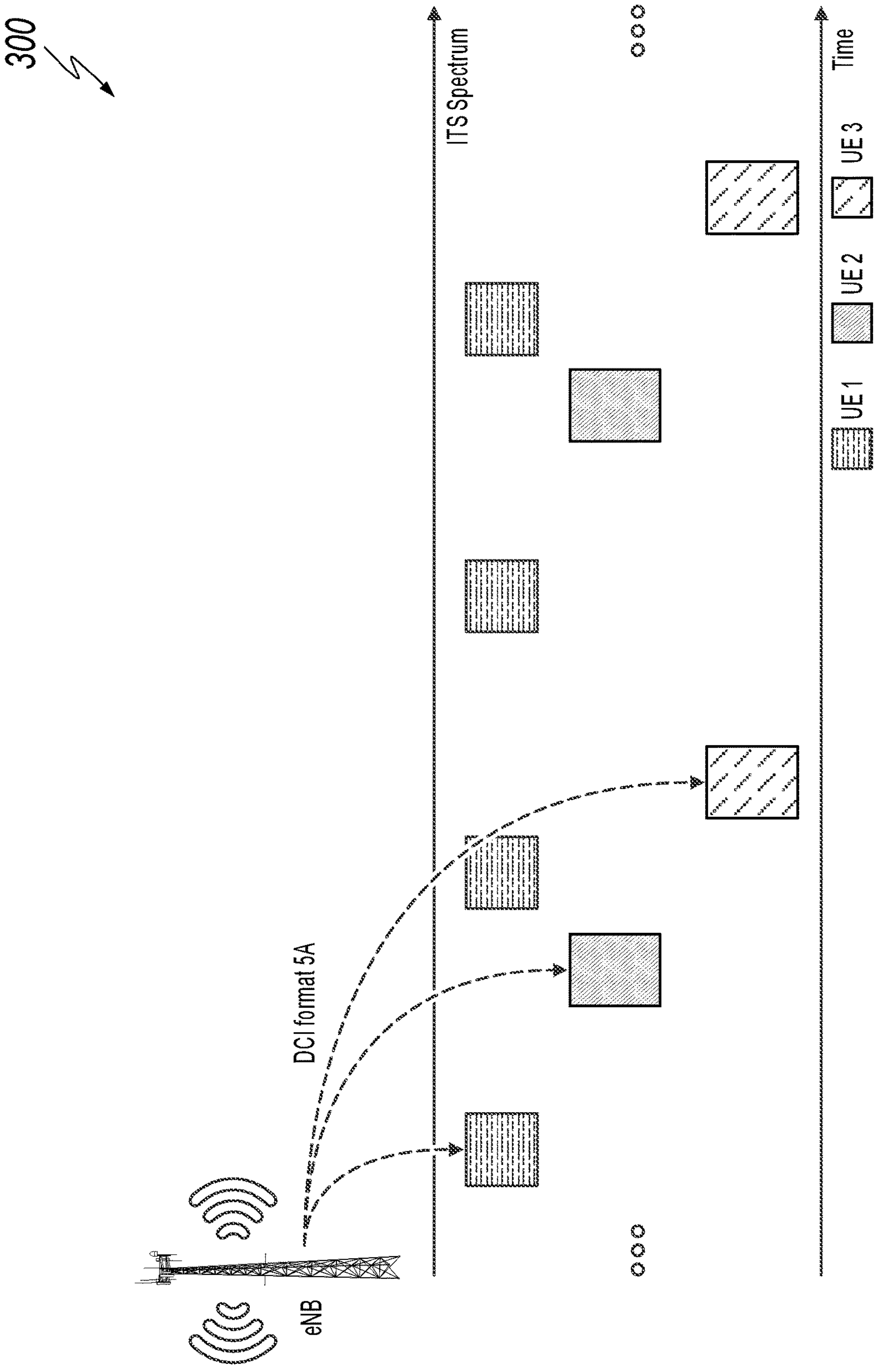
FIG. 3 shows an example of Long-Term Evolution (LTE) mode-3 sidelink communication according to an implementation.

In some case, LTE sidelink communication may include two modes including mode-3 sidelink communication and mode-4 sidelink communication. FIG. 3 shows an example of LTE mode-3 sidelink communication 300. The LTE mode-3 sidelink communication is similar to the NR mode-1 sidelink communication. The resource allocation in the LTE mode-3 sidelink communication may include following steps. First, a UE may request transmission resources from an eNodeB. Then, the eNodeB may semi-persistently or dynamically schedule the UE to support periodic or non-periodic V2X messages. With eNodeB scheduling, interferences can be controlled such that collision may be mitigated.

Figure 4:
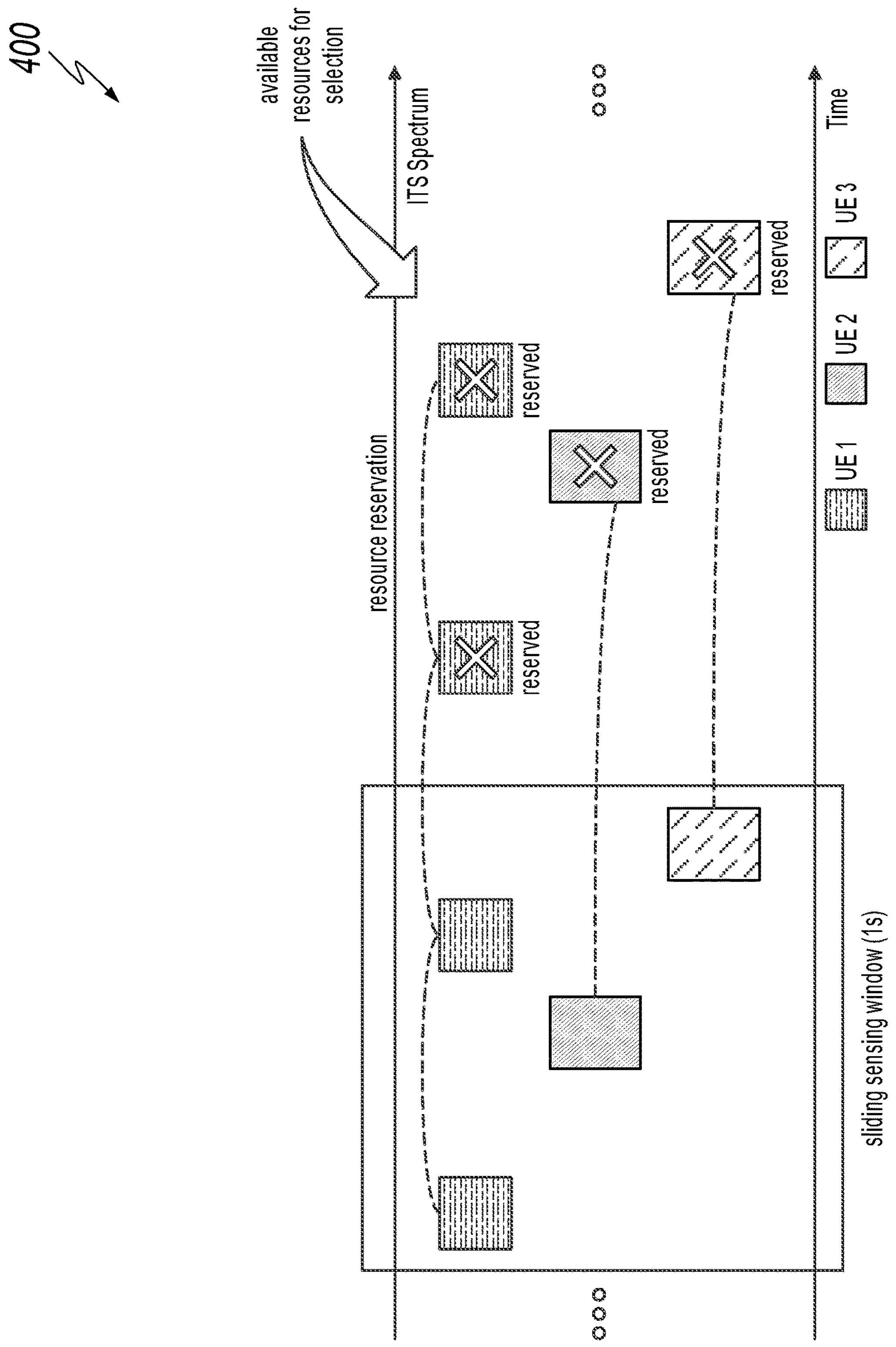
FIG. 4 shows an example of LTE mode-4 sidelink communication according to an implementation.

FIG. 4 shows an example of LTE mode-4 sidelink communication 400. The LTE mode-4 sidelink communication is similar to the NR mode-2 sidelink communication. The resource allocation in the LTE mode-4 sidelink communication may be performed using sensing and reservation. The resource allocation in the LTE mode-4 sidelink communication may include following steps. First, sensing information may be collected with PSSCH (physical sidelink shared channel) energy measurement. Next, high-energy resources are excluded and candidate resource set is determined. Then, transmission resources are selected from the candidate resource set. The UEs may transmit data on the selected transmission resources semi-persistently matching the traffic generation interval.

Figure 5:
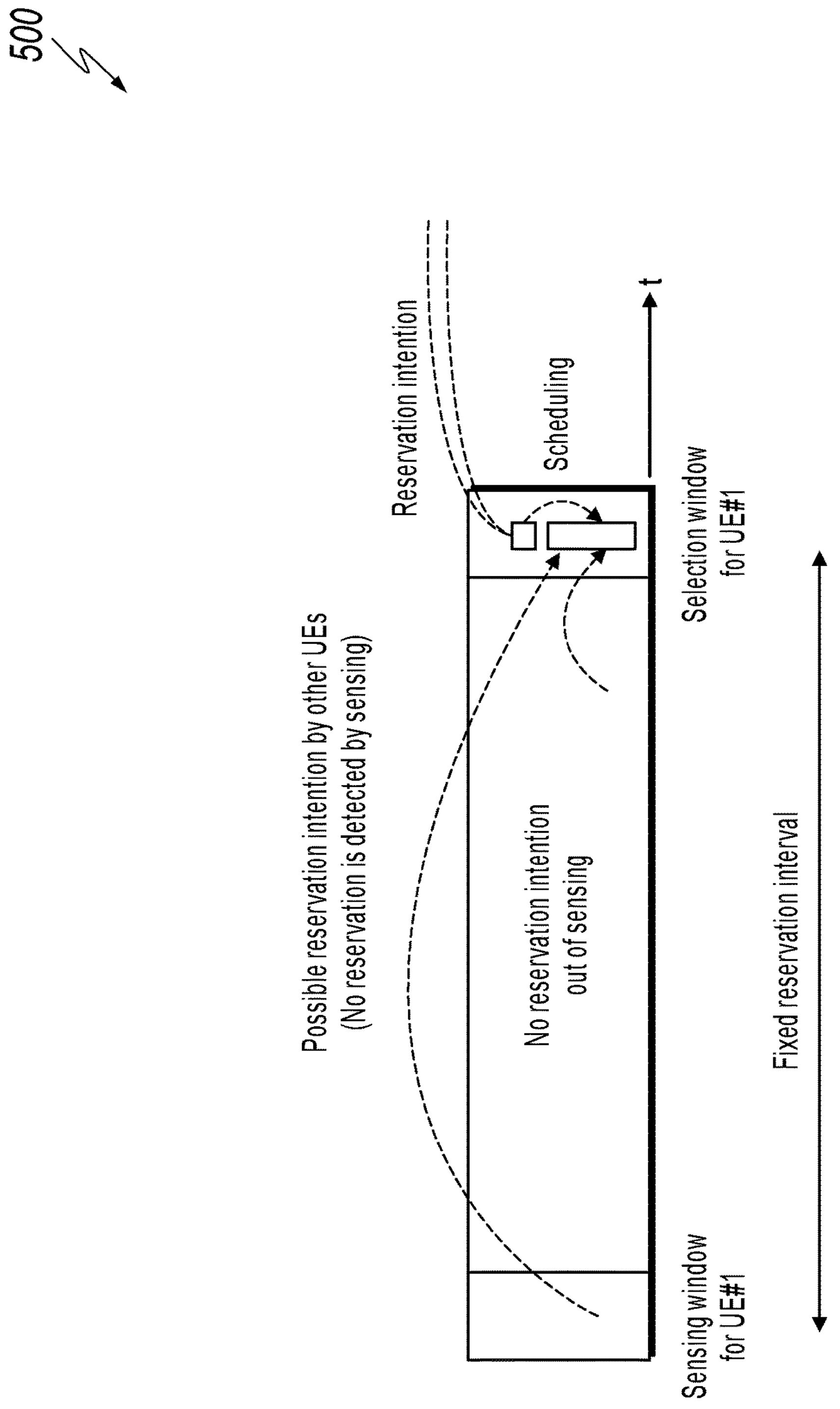
FIG. 5 shows an example of partial sensing window with fixed reservation interval according to an implementation.
Figure 6:
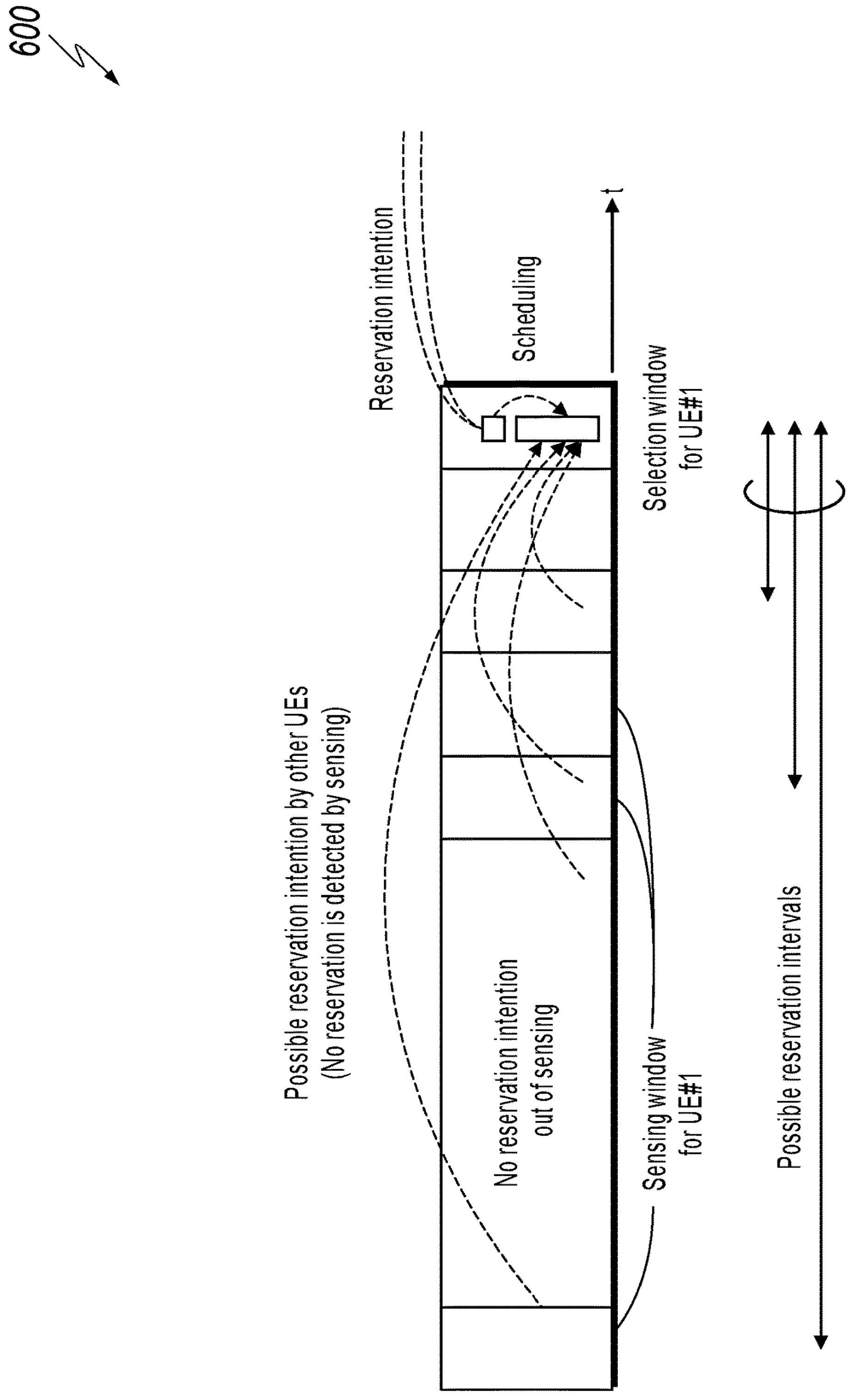
FIG. 6 shows an example of partial sensing window with variable reservation interval according to an implementation.

In some cases, partial sensing can be used to reduce power consumption. For example, the UE may not sense for the full sliding sensing window, but senses only a subset of the full sliding sensing window. In some cases, the partial sensing may be performed using partial sensing window with fixed reservation intervals or partial sensing window with multiple reservation intervals. FIG. 5 shows an example of partial sensing window 500 with fixed reservation interval. As shown, the UE senses on block of consecutive resources within the full sliding window (e.g., looms out of is). FIG. 6 shows an example of partial sensing window 600 with variable reservation interval. As shown, the UE senses multiple blocks of consecutive resources within the full sliding window (e.g., 10 sub-windows of 10 ms each within the is sensing window).

Figure 7:
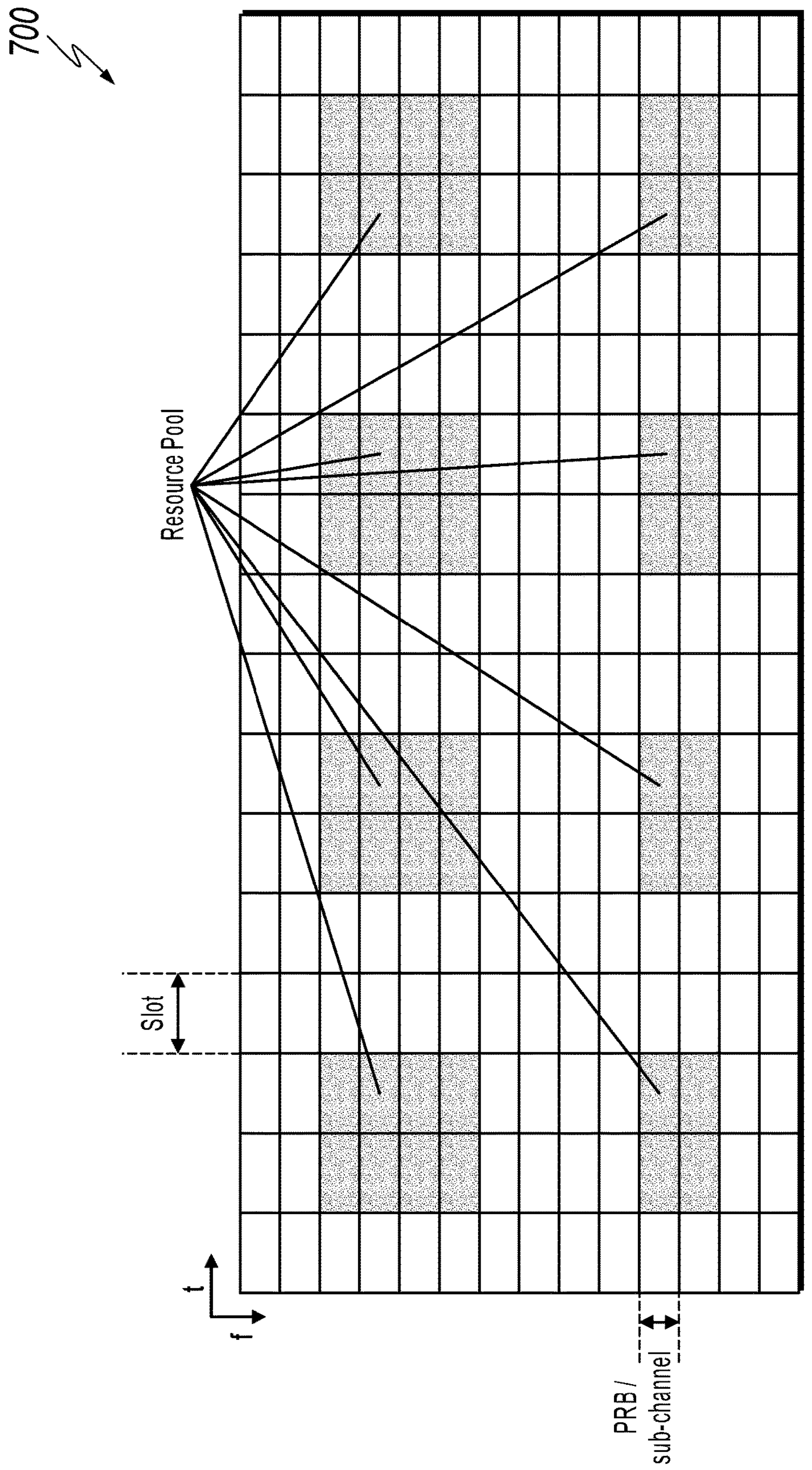
FIG. 7 shows an example of a resource pool in the time-frequency resource grid according to an implementation.

According to the agreements in RANi, a resource pool for sidelink can be configured by units of slots in the time domain and PRBs (physical resource blocks) or sub-channels in the frequency domain. FIG. 7 illustrates an example of a resource pool 700 in the time-frequency resource grid. As shown, the resource pool 700 includes multiple slots along the horizontal time axis and multiple PRBs/sub-channels along the vertical frequency axis.

Power consumption for the existing procedures defined on the sidelink can be high. Sources of power consumptions may include sensing operations and transmission. Sensing can require continuous monitoring of the media, thus is a significant drain on the UE power supply (e.g., battery). In some cases, transmission can require even more power than reception. Reducing the number of instances where a UE transmits data can be beneficial to conserve power.

The effects of the two sources of power consumption can be antagonistic to each other. For instance, a UE may skip sensing to reduce power consumption. However, because it may not choose the best transmission resources, it will have to transmit conservatively, e.g. using more resources, or may have to transmit the packet multiple times, thereby increasing power consumption.

In some scenarios where both low power nodes (LPN, e.g., V2P UEs) and high power nodes (HPN, e.g., V2V UEs) are present in one carrier, both the LPNs and HPNs may perform resource selections. The HPNs can sense all the resources, whereas the LPNs can partially sense resources. In one example of V2P and V2V communications on the same carrier, the pedestrian UEs (which can be LPNs) may not sense or only perform partial sensing, and transmit when they need to, e.g., when the pedestrian is in danger. This operation may be feasible for LTE because the QoS (quality of service) requirements can be low (e.g., 90% PRR (packet reception ratio)). For NR, because the QoS requirements are relatively higher (e.g., 99.X % PRR), the latency requirements can be stringent (e.g., up to 3 ms). Thus, the performance degradation by reusing the LTE sensing and resource allocation procedure might be too high to be acceptable for NR. Therefore, it may be desirable to perform sensing and resource allocation procedure more efficiently so that the LPNs can select reasonably good resources while minimally affecting the performance of the HPNs.

In some scenarios where public safety UEs are deployed on public safety carrier, whether sensing will be performed may be determined based on whether the public safety UEs are HPNs or LPNs. In some cases, center-command type public safety UEs (e.g., police cars) that coordinate multiple types of traffic and service can be HPNs. In some cases, the UEs of the HPN type may be configured to sense all the time. Handheld public safety UEs, such as handheld UEs by firefighters or other deployed first responders, can be LPNs. In some cases, the UEs of the LPN type may be configured to not sense all the time in order to provide high battery life.

Some techniques as described herein can be used to reduce power consumption caused by the sensing and resource allocation procedures in sidelink communication. For example, implicit resource pool may be introduced such that both LPNs and HPNs share the same resource pools but select resources from the resource pools based on predetermined priorities or preferences. Road-Side-Unit (RSU) reservation can also be adapted such that a local controller may reserve resources on behalf of the LPNs using the sensing procedure of the HPNs. The LPNs may randomly select resources within the reserved resources by the HPNs. Furthermore, Grant-Free operation of the LPNs can be performed on top of the HPN operations. For example, the HPNs may use sensing for resource selection, while the LPNs may select random resources without sensing. In some cases, configuration of resource pools with no sensing may be used to conserve energy and reduce power consumption.

With the implicit resource pool, all UEs may share the same resource pool(s). In V2X/V2P systems, the UEs may include multiple types of devices including Rel-16 NR V2V UEs, Rel-17 NR V2P UEs, and Rel-17 NR V2V UEs. In general, the Rel-16 NR V2V UEs may not be configured for being on the same carrier as a pedestrian UE. The Rel-17 NR V2P UEs are generally low power UEs (e.g., LPNs). These V2P UEs may not listen all the times and may not follow the full Rel-16 sensing procedure, but can transmit with relaxed sensing requirements. The Rel-17 NR V2V UEs are similar to the Rel-16 V2V UEs. However, unlike the Rel-16 V2V UEs, the Rel-17 NR V2V UEs may be aware of the transmission configuration of V2P UEs.

During operation with the implicit resource pool, the Rel-16 V2V UEs operate as usual. The Rel-17 V2P UEs can be concentrated in sub pool(s) within the V2V resource pool and can occupy only the resources allocated to them. As such, the Rel-16 V2V UEs, when sensing, will likely detect that the V2P UEs are occupied, thus will not select resources where the V2P UEs are located, unless these resources are empty, or if latency constraints are such that they must use them. The Rel-17 V2V UEs may be aware of the V2P resource pools/sub-pools, and could either consider them as reserved, or use them as second priority.

Figure 8:
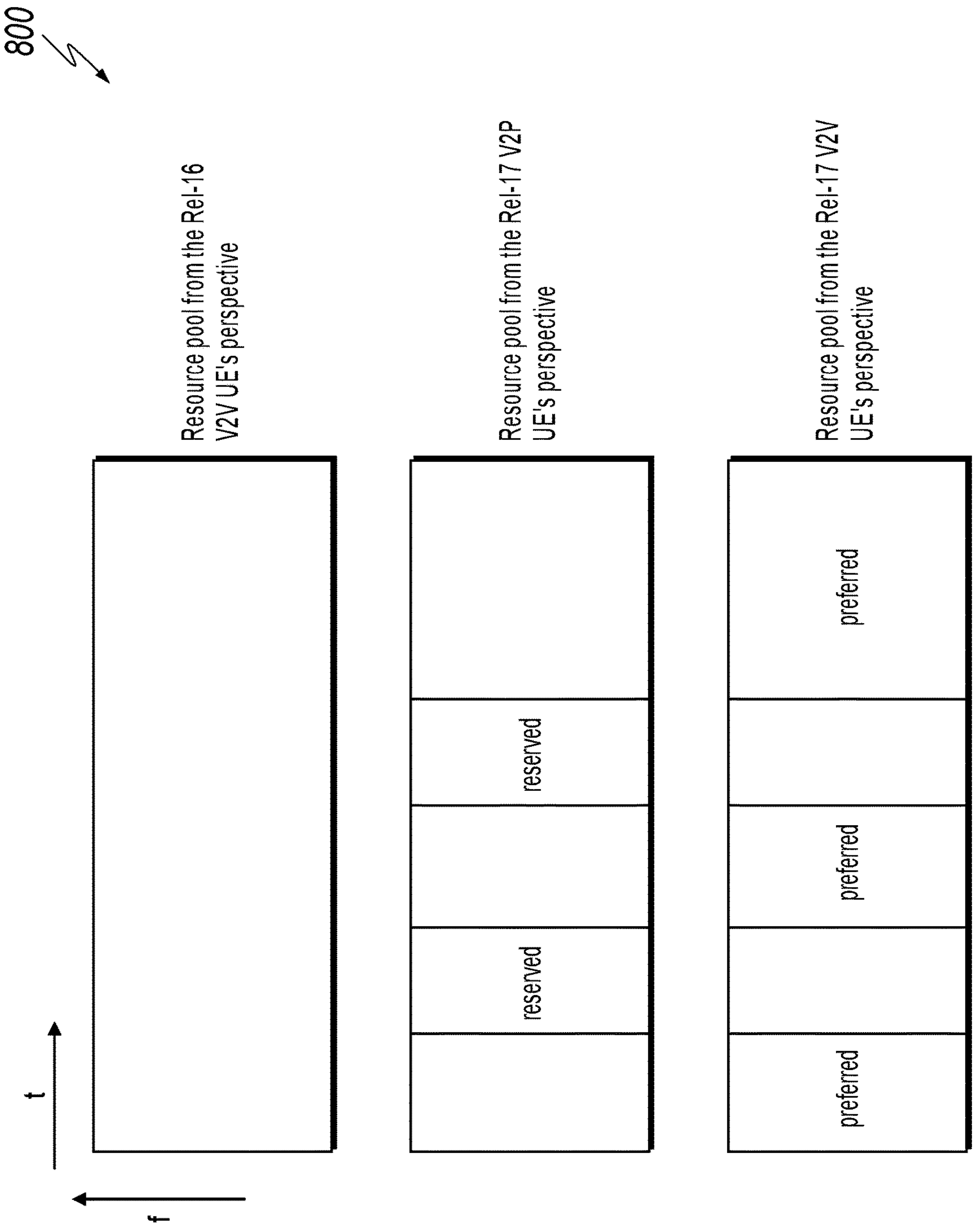
FIG. 8 shows an example of a resource pool for three categories of user equipment (UE)'s perspective according to an implementation.

FIG. 8 shows an example of a resource pool 800 from the three categories of UE's perspective. As shown, from a Rel-16 V2V UE, all resources are accessible. From a Rel-17 V2P UE, only the resources shown as "reserved" can be used. For a Rel-17 V2V UE, the resources in the resource pool other than the reserved resources (which are shown as "preferred") are to be selected first. The reserved resources are either marked as excluded or selected with a lower priority.

The Rel-16 V2V operation may be unaffected by the presence or absence of the Rel-17 V2P UEs. In some cases, the Rel-16 V2V UEs may obtain the Rel-16 V2V UE resource pool through configuration or pre-configuration. The Rel-17 V2P UEs may also receive the Rel-17 V2P UE resource pool through configuration or pre-configuration. In some cases, the Rel-17 V2P UEs may select resources from their respective resource pool according to predefined resource selection rules (e.g., random selection, full sensing, and partial sensing).

Figure 9:
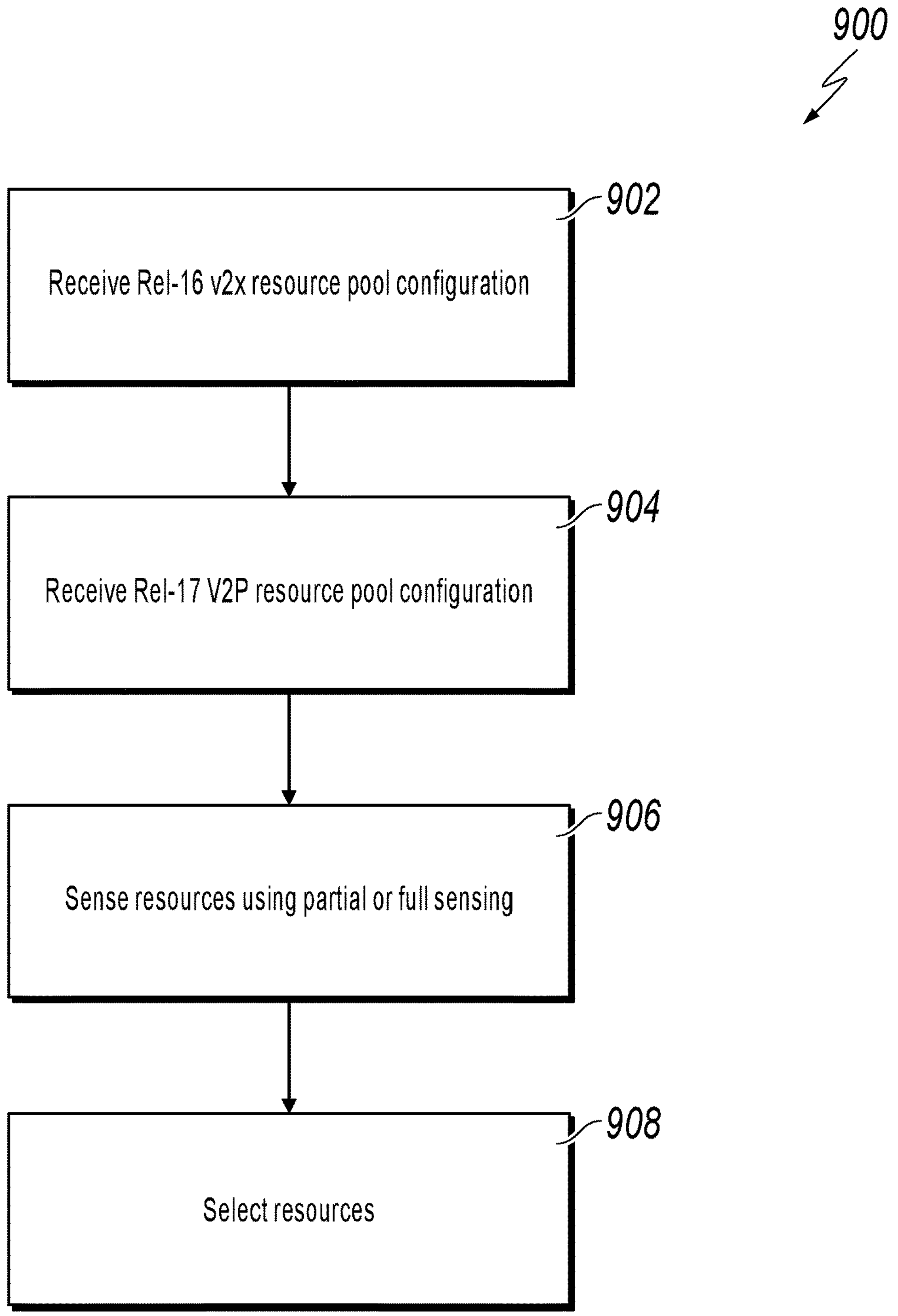
FIG. 9 shows a flowchart illustrating an example of resource selection process according to an implementation.

FIG. 9 is a flowchart illustrating an example of resource selection process 900. In some cases, the process 900 can be performed by V2V UEs (e.g., UEs 112 and 114). In some cases, the process 900 can be performed by Rel-17 V2V UEs. At step 902, a V2V UE (e.g., Rel-17 V2V UE) receives a Rel-16 V2X resource pool configuration. In some cases, the V2V UE may obtain the Rel-16 V2X resource pool configuration using an existing procedure of Rel-16 (e.g., pre-configuration, SIB signaling, etc.). In some cases, step 902 may be skipped, for example, if the carrier is only configured for Rel-17 UEs.

At step 904, the V2V UE receives a Rel-17 V2P resource pool configuration. In some cases, the V2V UE may obtain the Rel-17 V2P resource pool configuration with a similar signaling message as a Rel-16 message. In some cases, the signaling message may include information that indicates whether the Rel-17 V2P resource pool is associated with a Rel-16 V2X resource pool. In some cases, if the V2P resource pool is fully included within a Rel-16 V2X pool, such a signaling may not be needed. However, if there is only a partial overlap, or no overlap at all, such an indication might be useful, for example, when the V2P resource pool is FDM-ed (frequency division multiplexed) with the V2X resource pool. In some cases, the symbols where V2P transmission occurs may be avoided by the Rel-17 V2V UE so that significant IBE (identity based encryption) generated by the V2X transmission may be mitigated for resources in the V2X resource pool.

In some cases, the signaling message may further include information that indicate the Rel-17 V2P behavior. For example, the signaling message may include an indication whether the UE should skip the V2P resources, or use it with lower priority, or only when congestion on other resources is high. In some cases, this indication may be sent with resource pool configuration. In some cases, the indication may be sent in a separate message different from the signaling message. As such, it increases the flexibility of the resource allocation procedures and usage of the resource pools. For example, the pedestrian density may be lower at nights than at rush hours. Thus, there may be no need to prevent the UEs from using the V2P resources at nights. In some cases, the indication may be associated with geographical parameters to indicate demographic information at certain locations.

At step 906, the V2V UE senses the resources after obtaining the resource pool configuration. In some cases, the V2V UE may sense the resources with partial sensing window or full sensing window. In one example, the V2V UE may sense the resources in the resource pool using the partial sensing procedures as described with respect to FIGS. 5-6. In some cases, the V2V UE may sense all the resources, or avoid sensing the resources where the V2P UEs can be present. In some cases, the V2V UE can generate a candidate resource set after sensing the resources. In one example, the candidate resource set may include unoccupied resources in the resource pool.

At step 908, the V2V UE selects resource from the candidate resource set. In some cases, the V2V UE may omit potential V2P resources. As such, the V2V UE may not interfere with V2P UEs at the cost of potential system throughput loss. However, this loss may be acceptable for services with high reliability and low latency. In some cases, the V2V UE may omit potential V2P resource if the system load is below a threshold. If the system load is high on the non-V2P resources, the UE may be allowed to select resources in the V2P zone. In some cases, the V2V UE may omit or select potential V2P resources based on the traffic priority. For example, high-priority traffic may be confined to non-V2P resources, whereas low-priority traffic may occupy V2P resources. In some cases, reservation signal may be used to prevent Rel-16 UEs from using those pools of V2P resources when the V2P UEs does not use the V2P resources.

Road-Side-Unit (RSU) reservation can also be adapted such that a local controller may reserve resources on behalf of the LPNs using the sensing procedure of the HPNs. The LPNs may randomly select resources within the reserved resources by the HPNs. The RSU (Road-Side-Unit) resource reservation is described herein in a V2V/V2P context. Generally, an RSU is a wireless communication device located on the roadside that provides connectivity and information support to passing vehicles, including safety warnings and traffic information. In some cases, an RSU can be located at the intersection to provide safety, or to generate a dynamic, and high resolution traffic map. In this case, the RSU may need to reserve resources that the UEs (e.g., V2V UEs or V2P UEs) would use but also have some resources they can use to transmit the aggregate traffic map. In some cases, the RSU resource reservation may be also applicable to a public safety scenario. In the public safety scenario, the RSU may be a mini base station (e.g., a police car).

In some cases, a RSU may be located at an area where pedestrians are likely to be present (e.g., intersection, traffic light, pedestrian crossway, etc.). In operation, the RSU may reserve some resources for pedestrian usage by signaling in an SCI (sidelink control information) that it reserves resources. Then, the V2P UEs can obtain the configuration of the reserved resources. When needing to transmit, the V2P UEs may select one of the reserved resources for transmission. The RSU resource reservation as described herein can provide an ability for both REL-16 and Rel-17 UEs to detect V2P UEs because the Rel-16 reservation process can be used by the RSU. The RSU resource reservation can also provide adaptability to vehicular traffic. For example, resource may be reserved only when a light is green at an intersection. Furthermore, the RSU resource reservation may provide full prevention of interference because all vehicles in proximity of the intersection can receive the SCI containing the reservation signal.

Figure 10:
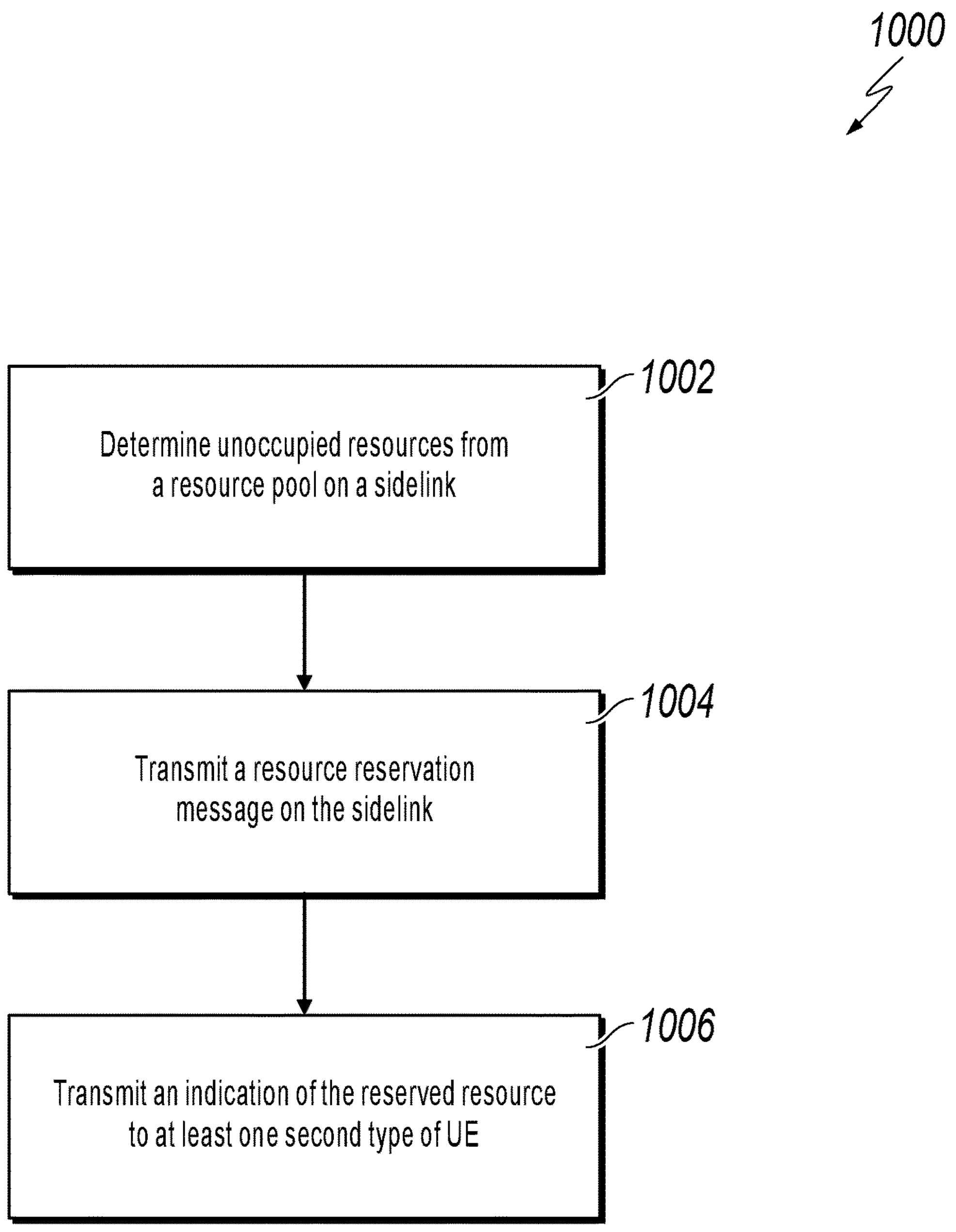
FIG. 10 shows a flowchart illustrating an example of resource reservation process according to an implementation.

FIG. 10 is a flowchart illustrating an example of resource reservation process 1000. In some cases, the process 1000 can be performed by a road-side-unit (e.g., UEs 112 and 114, or base station 116). At step 1002, the RSU determines unoccupied resources from a resource pool on a sidelink. The resource pool may include time resources (e.g., slots) and frequency resources (e.g., sub-channels/PRBs) that can be used for transmission. In some cases, the RSU determines unoccupied resources from the resource pool on the sidelink using a sensing procedure with a predetermined sensing window. In some cases, the RSU can perform a sensing procedure using the sensing procedure of the HPNs. In one example, the RSU may perform the sensing procedure using the sensing procedure of the V2V UE as described with respect to FIG. 9. In this example, the RSU may determine the unoccupied resources from the resource pool on the sidelink using a sensing procedure with a partial sensing window or a full sensing window. In some cases, the RSU can determine a subset of the unoccupied resources as reserved resources. In some cases, the RSU may skip the sensing procedure and directly send the reservation signal.

At step 1004, the RSU transmits a resource reservation message on the sidelink. In some cases, the resource reservation message is configured to instruct first type of UEs (e.g., V2V UEs) to avoid reserved resources for second type of UEs (e.g., V2P UEs). For example, the RSU may send the resource reservation message to the V2V UEs so that the UEs know to avoid the reserved resources as determined at step 1002. As noted, the reserved resources include a subset of the unoccupied resources. The resources in the resource pool other than the reserved resource can still be used by the V2V UEs for transmission. In some cases, the resource reservation message includes a configuration of the reserved resources. For example, the resource reservation message may include a configuration of the time resources (e.g., slots) and frequency resources (e.g., sub-channels/PRBs) that are reserved for the V2P UEs.

In some cases, the resource reservation message is sent in a sidelink control information (SCI) message. The RSU may use the SCI message to schedule the transmission of data on the physical sidelink shared channel (PSSCH). The SCI message can be configured to convey the time and frequency resources of the PSSCH, parameters for hybrid automatic repeat request (HARQ) process, such as the redundancy version, process identifiers, new data indicator, and resources for the physical sidelink feedback channel (PFSCH). The SCI message may include a bit field indicating a representation who the source UE is. The SCI message may include a bit field indicating a representation who the destination UE(s) is/are. The SCI message may include other fields including the modulation coding scheme used to encode the payload and modulate the coded payload bits, the demodulation reference signal (DMRS) pattern, the antenna ports, and priority of the payload.

In some cases, the SCI message can be sent in two stages. In one example, a first stage of the SCI message carries information related to channel sensing, and is transmitted over a physical sidelink control channel (PSCCH). The first stage of the SCI message may be used for scheduling physical sidelink shared channel (PSSCH) and a second stage of the SCI message on the PSSCH. The second stage of the SCI is transmitted over a PSSCH and may be used for decoding the PSSCH. In some cases, the resource reservation message is sent in a first stage of the SCI message. Alternatively, the resource reservation message is sent in a second stage of the SCI message. In some cases, a receiving UE of the SCI message (e.g., a destination UE) may decode the first stage of the SCI message to obtain the resource reservation information if the resource reservation message is sent in the first stage of the SCI message. In some cases, a receiving UE of the SCI message may decode the second stage of the SCI message to obtain the resource reservation information if the resource reservation message is sent in the second stage of the SCI message. In some cases, while both the first stage and the second stage are sent with the SCI message and the resource reservation message is sent in the first stage, the receiving UE may decode the first stage of the SCI message and skip decoding the second stage of the SCI message to reduce power consumption. Alternatively, a source UE (e.g., the RSU) may only send the first stage of the SCI message and skip sending the second stage of the SCI message to reduce transmission cost.

In some cases, the resource reservation message further includes an indication of a priority level. In some cases, a UE that receives the resource reservation message can determine whether to ignore the resource reservation message based on the indication of priority level in the resource reservation message. In one example, the priority level may be a priority level of a data packet that is transmitted by the UE. In this example, if the priority level of the data packet is equal to or higher than the priority level indicated in the resource reservation message, the UE may ignore the resource reservation message and continue to transmit the data packet, e.g., on the reserved resources. If the priority level of the data packet is lower than the priority level indicated in the resource reservation message, the UE may refrain from transmitting the data packet on the reserved resources.

In another example, the priority level may be a priority level of a UE (e.g., a V2V UE or a V2P UE). In this example, if the priority level of the UE is equal to or higher than the priority level indicated in the resource reservation message, the UE may ignore the resource reservation message and continue data transmission. If the priority level of the UE is lower than the priority level indicated in the resource reservation message, the UE may refrain from data transmission on the reserved resources.

At step 1006, the RSU transmits an indication of the reserved resources to at least one second type of UE. For example, the RSU may indicate the resource reservation to the V2P UEs. The RSU may indicate the resource reservation in multiple manners. In some cases, the RSU can configure a Radio Network Temporary Identifier (RNTI) in the resource reservation message or the SCI message sent to the V2V UEs. The RNTI may be used to scramble CRC parity bits of the resource reservation message and indicate the reserved resources for the second type of UEs. In some cases, the RSU can configure a field in the resource reservation message that indicates the reserved resources for the second type of UEs.

In some cases, the RSU can transmit a SCI message to the at least one second type of UE (e.g., V2P UE). The SCI message may be configured to indicate the reserved resources for the second type of UEs. In one example, the SCI message may be sent relatively infrequently at known time instances by the V2P UEs so that the V2P UEs do not need to always listen to the PSCCH (physical sidelink control channel). In some cases, the SCI message that is sent to the at least one second type UE may be the same as the SCI message that is sent to the first type UEs, and the two SCI messages may use the same signaling.

In some cases, the RSU can transmit a Radio Resource Control (RRC) message to the at least one second type of UE. The RRC message may be configured to indicate the reserved resources for the second type of UEs. In one example, a SIB (system information block) may be broadcast to indicate the reserved resources for V2P UEs.

Figure 11:
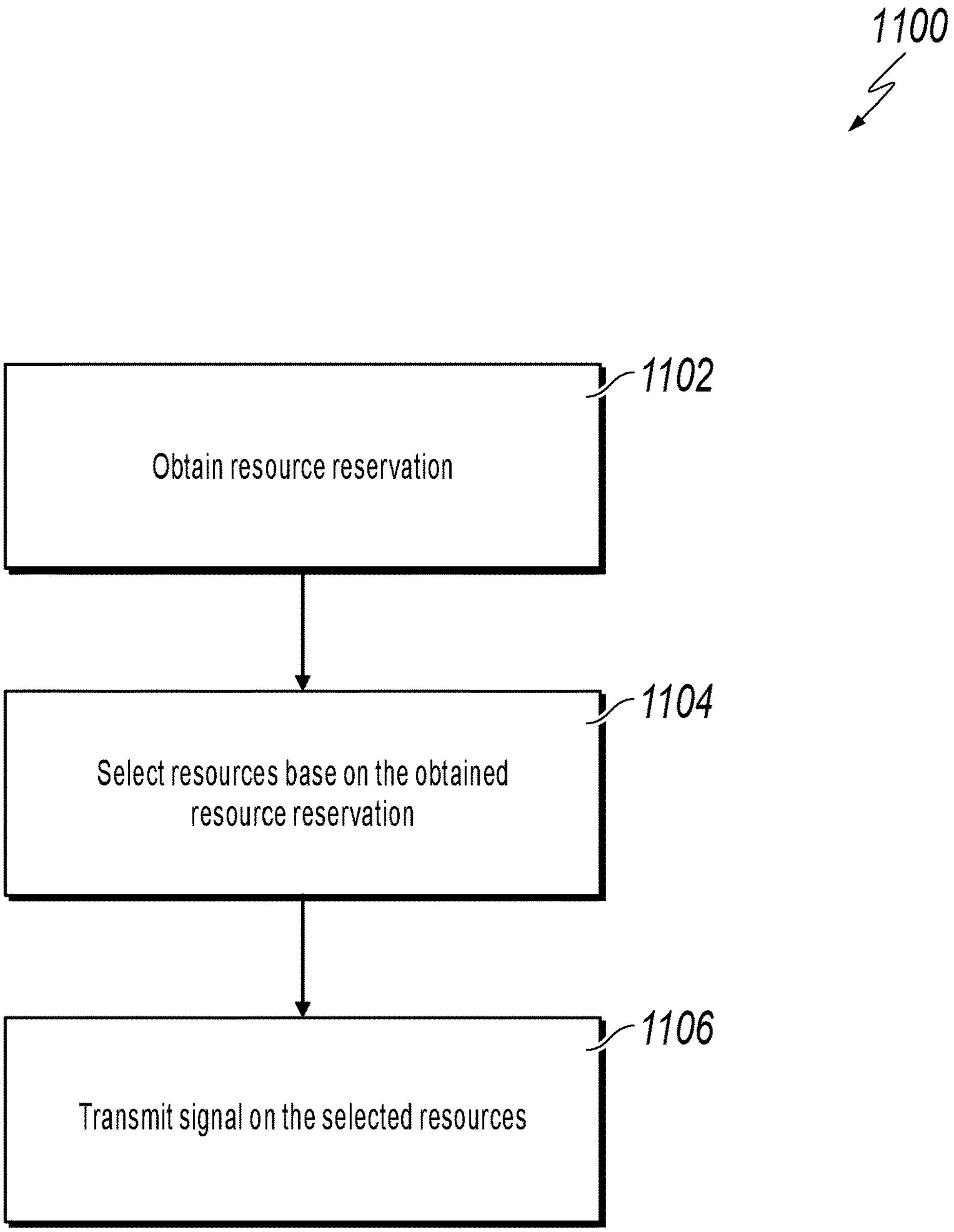
FIG. 11 shows a flowchart illustrating an example of resource reservation process according to an implementation.

FIG. 11 is a flowchart illustrating an example of resource reservation process 1100. In some cases, the process 1100 can be performed by a UE, such as the V2P UE 110 of FIG. 1.

At step 1102, the UE obtains resource reservation information. In some cases, the UE receives a SCI message that includes the resource reservation information. The resource reservation information may include the resources, such as time and frequency resources, that are reserved for V2P UEs. In some cases, the SCI message may include a Radio Network Temporary Identifier (RNTI) that is used to scramble CRC parity bits of the resource reservation information and that indicate the reserved resources for the UE. In some cases, the SCI message may include a first stage and a second stage. As noted, the first stage of the SCI message may be used for scheduling PSSCH and the second stage of the SCI message on the PSSCH. The second stage of the SCI message may be used for decoding the PSSCH. In some cases, the resource reservation information is received in the first stage of the SCI message. In some cases, the resource reservation message is received in the second stage of the SCI message. In some cases, the UE may skip decoding the second stage of the SCI message if the resource reservation message is received in the first stage of the SCI message, for example, to reduce power consumption.

In some cases, the UE may receive a Radio Resource Control (RRC) message that indicates the reserved resources. In one example, the UE may receive a SIB (system information block) that indicates the reserved resources for V2P UEs.

At step 1104, the UE selects one or more resources from the reserved resources. In some cases, the UE may select the resources according to a V2P resource selection procedure. In one example, the UE can select the resources based on random resource selection. In another example, the UE can perform partial sensing and then select the resources from the sensed resources.

At step 1106, the UE transmits signal on the selected resources. In some cases, the UE can transmit an SCI message to indicate the resources that are selected and used for transmitting the signal. In some cases, the UE may not send the SCI message. Instead, the RSU that sends the resource reservation information may provision up to a number of N V2P UEs, and send N SCI messages to reserve N possible resources for the N V2P UEs, respectively. Each V2P UE is then restricted to using one of the N resources.

Grant-Free operation of the LPNs can be performed on top of the HPN operations to conserve power of the UEs. In some cases, the HPNs (e.g., V2V UEs) may use sensing for resources selection, while LPNs (e.g., V2P UEs) may use random resource selection without sensing. In some examples, the resource pools of the V2P UEs and the V2V UEs may be overlapping. In these examples, the V2P UEs may transmit a pattern (e.g., reference on grant free pattern) in the V2V resource pools, thus may partially interfere with the V2V UEs. The V2P UEs may not need to transmit an SCI. In some cases, a list of V2P patterns may be provided to the V2V UEs. The V2V UEs may actively monitor for the grant-free patterns to detect the V2P UEs. The V2P UE may obtain a list of potential patterns to use for V2P transmission. The list may be obtained by pre-configuration using dedicated or common RRC signaling. The list of patterns may be associated with a given resource pool for V2V UEs. In some cases, when the V2P UE needs to transmit a V2P signal, it may select one of these patterns. The pattern may be selected randomly, pseudo-randomly (e.g., based on a UE ID), allocated by the network to this particular UE, etc.

In some cases, the V2V UE obtains the list of patterns that is associated with V2P transmission. The V2V UE may monitors at all times for all the V2P patterns. In some cases, this may done independently of the sensing operation and of the usual PSCCH monitoring. In one example, when the V2V UE detects and decodes a V2P pattern, it then obtains the V2P message.

In some cases, the resource pools may be configured as no sensing. In one example, the resource pools may be configured with a field that indicates whether sensing is mandatory to transmit in the pools. In this example, the field may have one value that indicates sensing is mandatory to transmit in the pools, and have another value that indicates sensing is not mandatory.

In some cases, the field indicating whether sensing is mandatory can be read and understood by all UEs doing sidelink. In some cases, the field indicating whether sensing is mandatory may apply to public safety UEs (e.g., handheld UEs by firefighters or other deployed first responders) only. Non-public-safety UEs may be configured to ignore the field and do sensing.

In some cases, the sensing thresholds for a public safety UE can be set to minus infinity. When a public safety UE determines that a resource pool has mandatory sensing, it may either choose not to transmit in this resource pool, or to apply sensing when transmitting in a resource pool.

Figure 12:
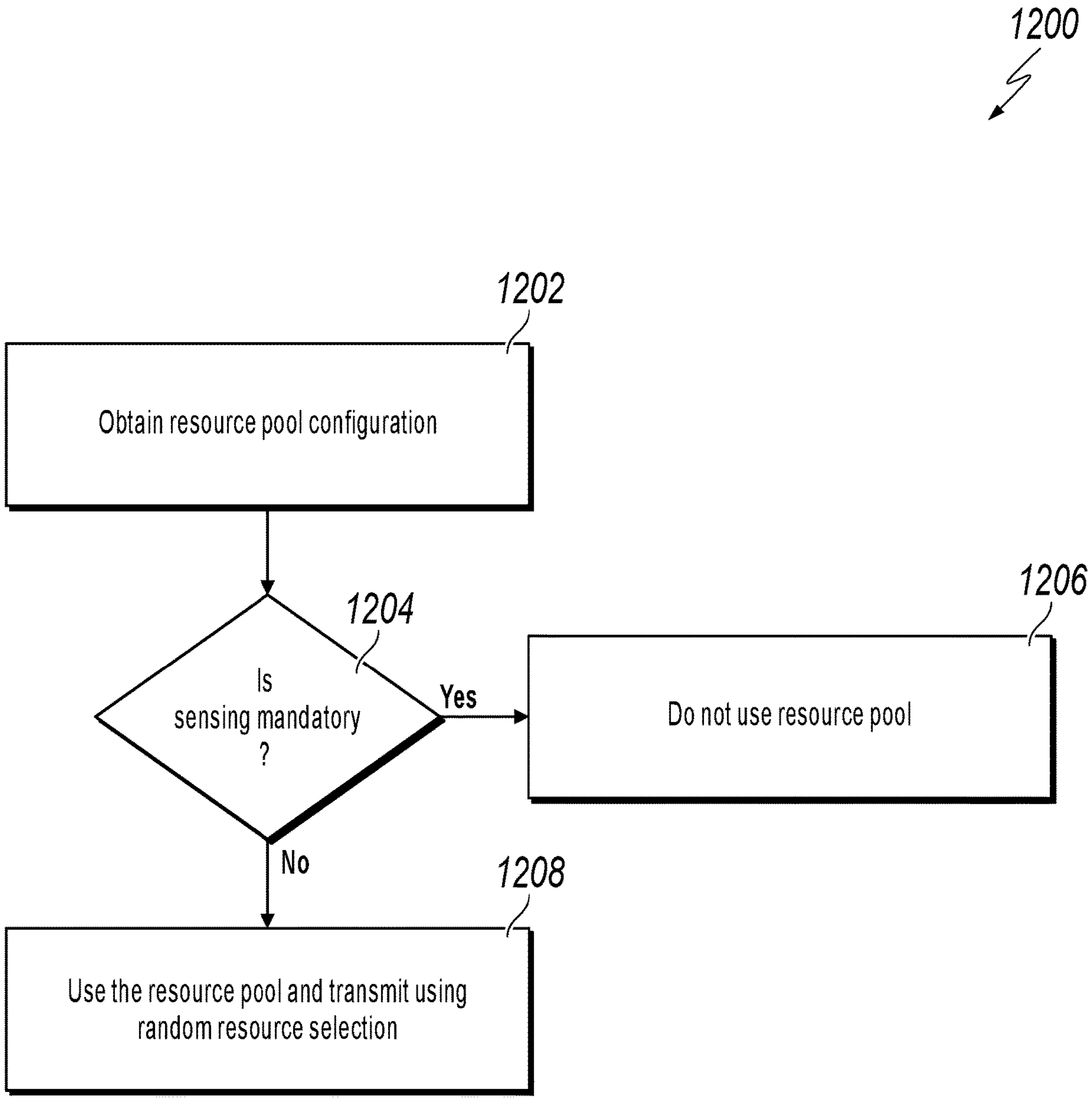
FIG. 12 shows a flowchart illustrating an example of resource selection process according to an implementation.

FIG. 12 is a flowchart illustrating an example of resource selection process 1200. In some cases, the process 1200 can be performed by a UE, such as the V2P UE 112 in FIG. 1.

In some cases, the process 1200 can be performed by a public-safety UE.

At step 1202, the UE obtains resource pool configuration of a resource pool. In some cases. The resource pool configuration may indicate that the resource pool is configured as no sensing or mandatory sensing. In one example, the resource pool configuration may include a field that indicates whether sensing is mandatory to transmit in the pool. In this example, the field may have one value that indicates sensing is mandatory to transmit in the pool, and have another value that indicates sensing is not mandatory. At step 1204, the UE determines whether sensing is mandatory based on the resource pool configuration. At step 1206, the UE determines not to use the resource pool upon determining that sensing is mandatory based on the resource pool configuration. For example, the UE may determine not to transmit using the resources in the resource pool in order to conserve power. At step 1208, the UE determines to use the resource pool upon determining that sensing is not mandatory. In one example, the UE may transmit using resource from the resource pool according to a random resource selection method.

In some cases, an exceptional resource pool defined in Rel-14 can be reused. With the exceptional resource pool, the UEs may transmit without sensing. UEs with proximity service enabled (e.g., ProSe UEs) may transmit in the exceptional resource pool only. If a large exceptional resource pool is configured (and possibly when no other resource pool configured), the ProSe UEs may have ample resources to communicate. In some cases, when only exceptional resource pool(s) are configured, all UEs may use the exceptional resource pool(s) and need not to sense.

A public safety UE can be configured as doing sensing or not, e.g., through UE capability. In such a case, some resource pools can be configured with sensing applied. A UE configured as doing sensing may uses these resource pools. If no sensing information is available, the UE may use the exceptional resource pool. A UE not configured as doing sensing may use the exceptional resource pool(s) only.

Figure 13:
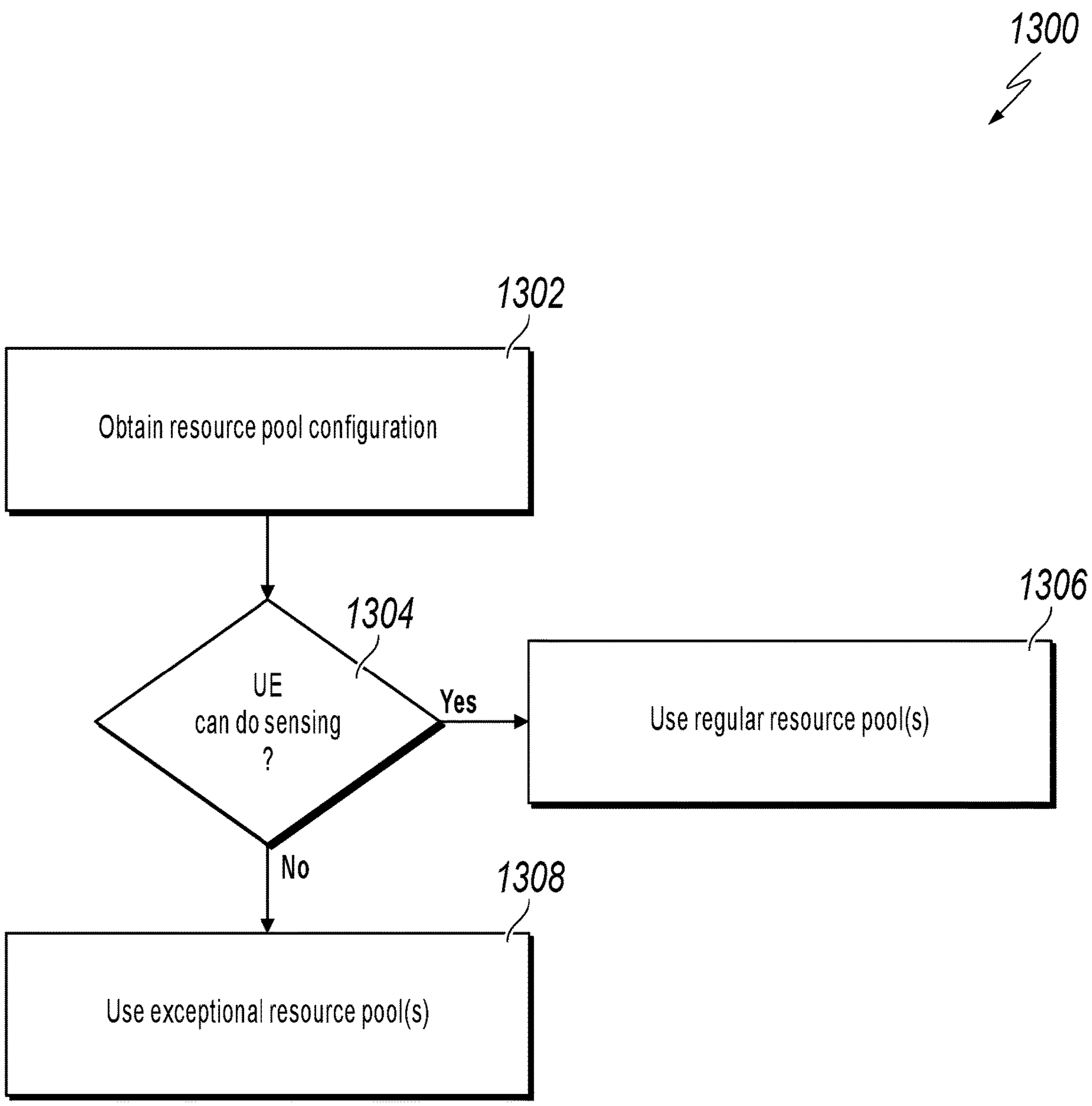
FIG. 13 shows a flowchart illustrating an example of resource selection process according to an implementation.

FIG. 13 is a flowchart illustrating an example of resource selection process 1300 based on an exceptional resource pool. In some cases, the process 1300 can be performed by a UE, such as the UEs 110, 112, and 114 of FIG. 1.

At step 1302, the UE obtains resource pool configuration. At step 1304, the UE determines whether the UE is configured as performing sensing. At step 1306, the UE uses regular resource pool(s) to transmit if the UE is configured as performing sensing. At step 1308, the UE determines to use exceptional resource pool(s) if the UE is configured as not performing sensing.

After determining which resource pool to use, the UE can transmit packet as specified for NR V2X UEs. In one example, the UE may encode the SCI per its data transmission packet. The UE can determine to perform resource reservation or not, and indicate it in the SCI. In some cases, the UE may be mandated not to use reservation, and set the reservation fields accordingly.

Figure 14:
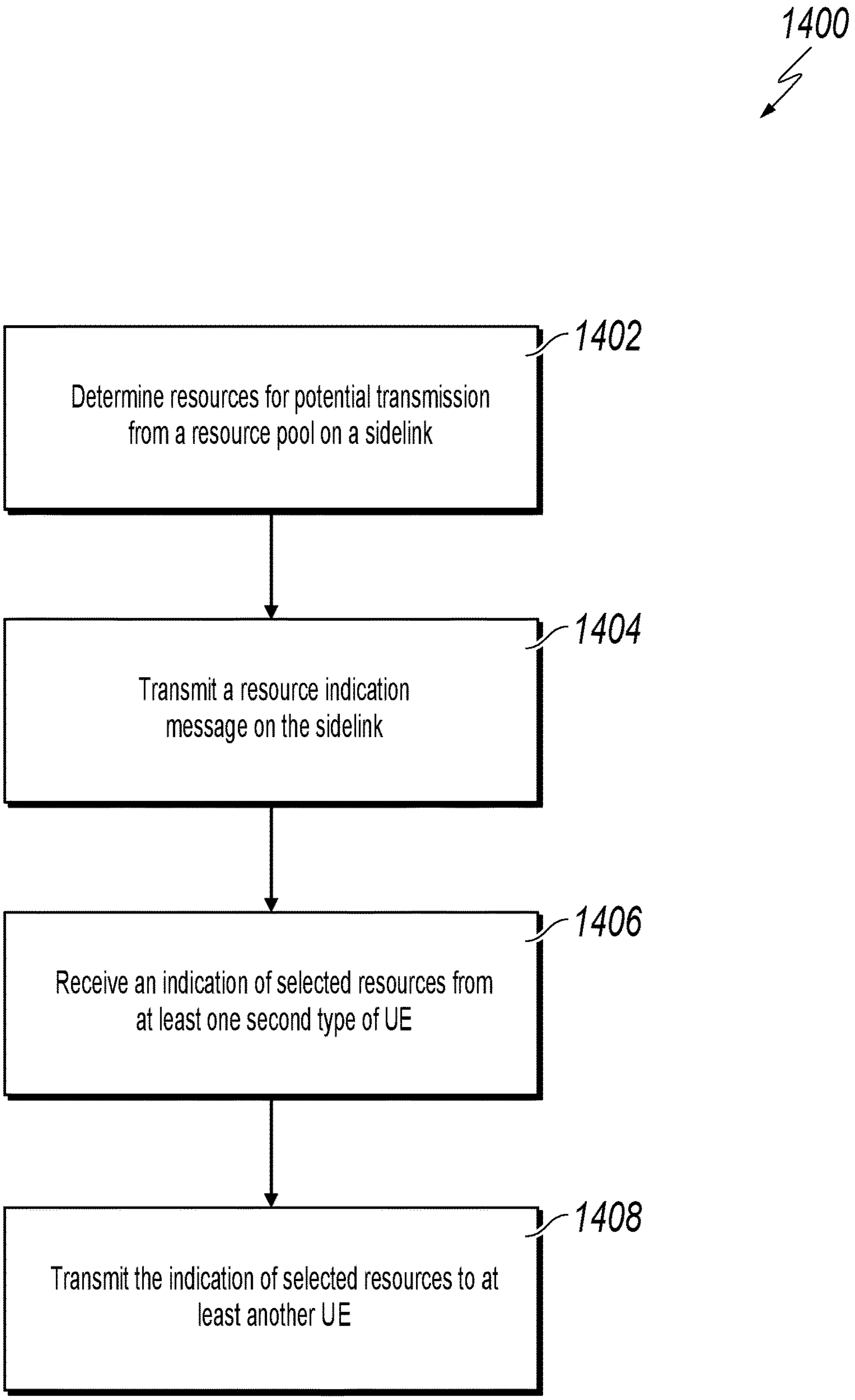
FIG. 14 shows a flowchart illustrating an example of resource reservation process according to an implementation.

FIG. 14 is a flowchart illustrating an example of resource reservation process 1400. In some cases, the process 1400 can be performed by a terminal device, such as a road-side-unit (e.g., UEs 112 and 114, or base station 116).

At step 1402, the terminal device determines resources for potential transmission from a resource pool on a sidelink. The resource pool may include time resources (e.g., slots) and frequency resources (e.g., sub-channels/PRBs) that can be used for potential transmission on the sidelink. In some cases, the terminal device determines the resources for potential transmission by performing a sensing procedure with a predetermined sensing window. In one example, the terminal device may perform the sensing procedure using the sensing procedure of the V2V UE as described with respect to FIG. 9. In this example, the terminal device may determine the resources for potential transmission using a sensing procedure with a partial sensing window or a full sensing window. In some cases, the terminal device may skip the sensing procedure.

At step 1404, the terminal device transmits a resource indication message on the sidelink. In some cases, the resource indication message includes a configuration of the resources that are determined for potential transmission. In one example, the configuration of the resources may include a configuration of the time resources (e.g., slots) and frequency resources (e.g., sub-channels/PRBs) that are preferred or usable by different types of UEs.

In some cases, the resource indication message may be used to instruct first type of UEs (e.g., V2V UEs) to avoid reserved resources for second type of UEs (e.g., V2P UEs). In one example, the configuration of the resources may indicate a subset of the resources that are usable by the first type of UEs and a subset of the resources that are usable by the second type of UEs. In some cases, the subset set of the resources that are usable by the first type of UEs may include a subset of unoccupied resources from the resources that are determined for potential transmission. In some cases, the subset set of the resources that are usable by the first type of UEs may include a subset of preferred resources for the first type of UEs. In some cases, the subset of the resources that are usable by the second type of UEs may include a subset of the preferred or reserved resources for the second type of UEs. In some cases, the subset of the resources that are usable by the second type of UEs may be also used by the first type of UEs, but with a lower priority than the subset set of preferred resources for the first type of UEs. For example, with reference to FIG. 8, the resources shown as “reserved” may be the resources that are usable by the second type of UEs (e.g., V2P UEs). In this example, the resources shown as “preferred” may be the preferred resources for the first type of UEs (e.g., V2V UEs). The “reserved” resources may be also used by the first type of UEs, but with a lower priority than the “preferred” resources. Based on the configuration of the resources in the resource indication message, the first type of UEs, e.g., the V2V UEs, can know to avoid the reserved resources for the V2P UEs or use the reserved resources at a lower priority.

In some cases, the resource indication message is sent in a sidelink control information (SCI) message. The terminal device may use the SCI message to schedule the transmission of data on the physical sidelink shared channel (PSSCH). The SCI message can be configured to convey the time and frequency resources of the PSSCH, parameters for hybrid automatic repeat request (HARQ) process, such as the redundancy version, process identifiers, new data indicator, and resources for the physical sidelink feedback channel (PFSCH). The SCI message may include a bit field indicating a representation who the source UE is. The SCI message may include a bit field indicating a representation who the destination UE(s) is/are. The SCI message may include other fields including the modulation coding scheme used to encode the payload and modulate the coded payload bits, the demodulation reference signal (DMRS) pattern, the antenna ports, and priority of the payload.

In some cases, the SCI message can be sent in two stages. In one example, a first stage of the SCI message carries information related to channel sensing, and is transmitted over a physical sidelink control channel (PSCCH). The first stage of the SCI message may be used for scheduling physical sidelink shared channel (PSSCH) and a second stage of the SCI message on the PSSCH. The second stage of the SCI is transmitted over a PSSCH and may be used for decoding the PSSCH. In some cases, the resource indication message is sent in a first stage of the SCI message. Alternatively, the resource indication message is sent in a second stage of the SCI message. In some cases, a receiving UE of the SCI message (e.g., a destination UE) may decode the first stage of the SCI message to obtain the resource indication information if the resource indication message is sent in the first stage of the SCI message. In some cases, a receiving UE of the SCI message may decode the second stage of the SCI message to obtain the resource indication information if the resource indication message is sent in the second stage of the SCI message. In some cases, while both the first stage and the second stage are sent with the SCI message and the resource indication message is sent in the first stage, the receiving UE may decode the first stage of the SCI message and skip decoding the second stage of the SCI message to reduce power consumption. Alternatively, a source UE (e.g., the RSU) may only send the first stage of the SCI message and skip sending the second stage of the SCI message to reduce transmission cost.

In some cases, the resource indication message further includes an indication of a priority level. In some cases, a UE that receives the resource indication message can determine whether to ignore the resource indication message based on the indication of priority level in the resource indication message. In one example, the priority level may be a priority level of a data packet that is transmitted by the UE. In this example, if the priority level of the data packet is equal to or higher than the priority level indicated in the resource indication message, the UE may ignore the resource indication message and continue to transmit the data packet, e.g., on the reserved resources. If the priority level of the data packet is lower than the priority level indicated in the resource indication message, the UE may refrain from transmitting the data packet on the reserved resources.

In another example, the priority level may be a priority level of a UE (e.g., a V2V UE or a V2P UE). In this example, if the priority level of the UE is equal to or higher than the priority level indicated in the resource indication message, the UE may ignore the resource indication message and continue data transmission. If the priority level of the UE is lower than the priority level indicated in the resource indication message, the UE may refrain from data transmission on the reserved resources.

In some cases, the terminal device may transmit the resource indication message in a same SCI message for different types of UEs. In some cases, the terminal device may transmit the resource indication message in different SCI messages for different types of UEs. In one example, in the SCI message sent to the first type of UEs, a specific RNTI used to scramble the CRC, or a field in the SCI message may indicate the resource reservation for the second type of UEs. In another example, a SCI message sent to second type of UEs may be sent relatively in frequently at known time instances by the second type of UEs so that the second type of UEs do not need to always listen to the PSCCH.

At step 1406, the terminal device receives an indication of selected resources from at least one second type of UE. In some cases, the selected resources include one or more of the resources that are usable by the at least one second type of UE (e.g., a V2P UE). In some cases, the at least one second type of UE may receive a SCI message that includes the resource indication message and select one or more resources based on the resource indication message. In one example, the at least one second type of UE may select the resources from the "reserved" resources as indicated in the resource indication message. In some cases, the at least one second type of UE can select the resources based on random resource selection. In some cases, the at least one second type of UE can perform sensing (e.g., partial sensing) and then select the resources based on a sensing result. In some cases, the at least one second type of UE can transmit a SCI message to indicate the resources that are selected and used for transmission.

At step 1408, the terminal device transmits the indication of selected resources to at least another UE. In some cases, the terminal device may transmit the indication of the selected resources to one or more first type of UEs, one or more second type of UEs, and/or other types of UEs. As such, the at least another UE can know to avoid the selected resources.

Figure 15:
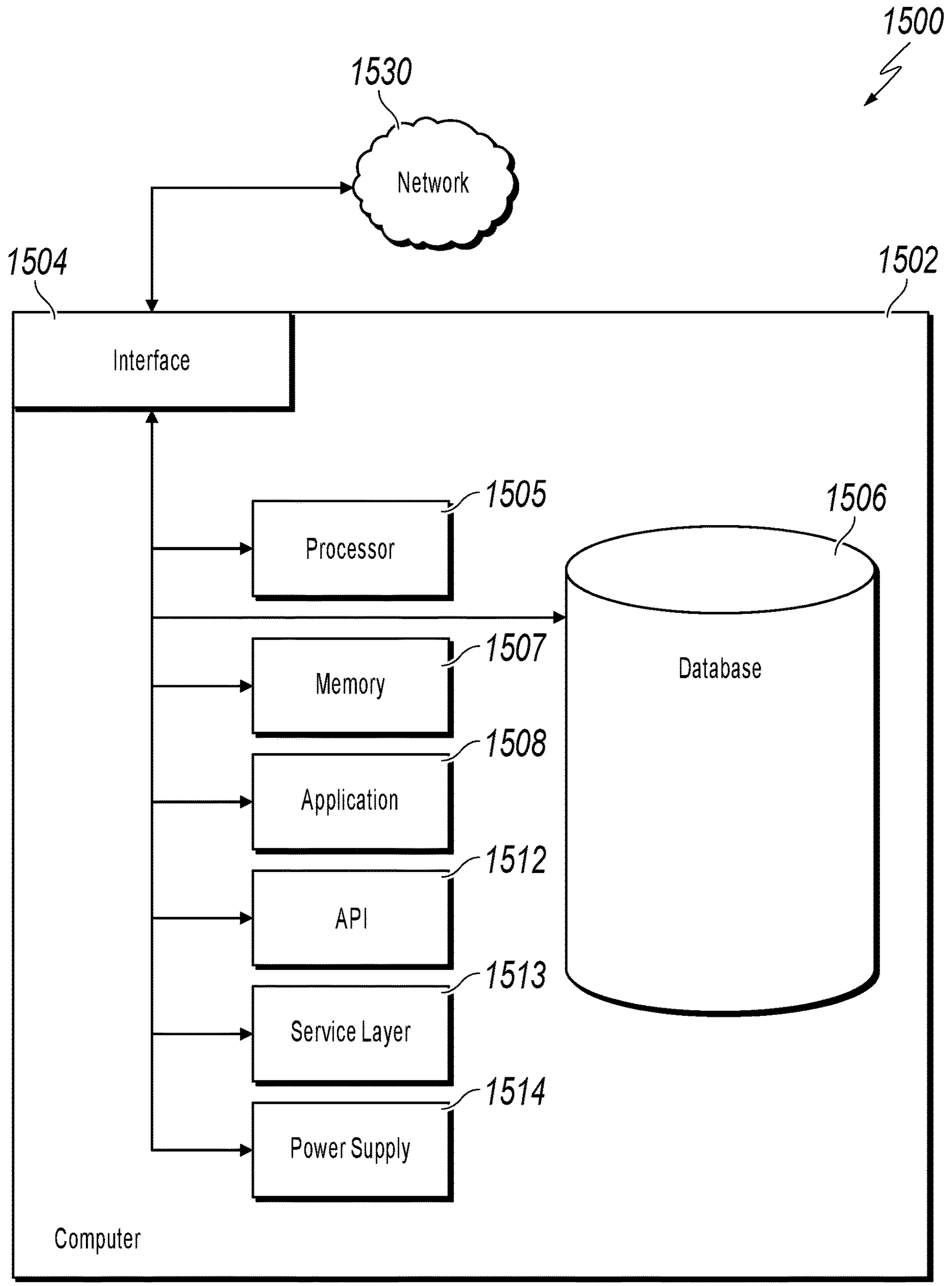
FIG. 15 shows a block diagram of an example computer system according to an implementation.

FIG. 15 is a block diagram of an example computer system 1500 used to provide computational functionalities associated with described algorithms, methods, functions, processes, flows, and procedures, as described in the instant disclosure, according to an implementation. The computer system 1500, or more than one computer system 1500, can be used to implement the electronic device described previously in this disclosure, e.g., UE, eNB, gNB, or other network nodes. In some cases, the computer system 1500 can be implemented as any one of the UEs 110, 112, 114, and the base station 116 of FIG. 1.

In some aspects, the computer 1502 may comprise a computer that includes an input device, such as a keypad, keyboard, touch screen, or other device that can accept user information, and an output device that conveys information associated with the operation of the computer 1502, including digital data, visual, or audio information (or a combination of information), or a graphical user interface (GUI).

The computer 1502 can serve in a role as a client, network component, a server, a database or other persistency, or any other component (or a combination of roles) of a computer system for performing the subject matter described in the instant disclosure. The illustrated computer 1502 is communicably coupled with a network 1530. In some implementations, one or more components of the computer 1502 may be configured to operate within environments, including cloud-computing-based, local, global, or other environment (or a combination of environments).

At a high level, the computer 1502 is an electronic computing device operable to receive, transmit, process, store, or manage data and information associated with the described subject matter. According to some implementations, the computer 1502 may also include, or be communicably coupled with, an application server, e-mail server, web server, caching server, streaming data server, or other server (or a combination of servers).

The computer 1502 can receive requests over network 1530 from a client application (for example, executing on another computer 1502) and respond to the received requests by processing the received requests using an appropriate software application(s). In addition, requests may also be sent to the computer 1502 from internal users (for example, from a command console or by other appropriate access methods), external or third-parties, other automated applications, as well as any other appropriate entities, individuals, systems, or computers.

Each of the components of the computer 1502 can communicate using a system bus 1503. In some implementations, any or all of the components of the computer 1502, hardware or software (or a combination of both hardware and software), may interface with each other or the interface 1504 (or a combination of both), over the system bus 1503 using an application programming interface (API) 1512 or a service layer 1513 (or a combination of the API 1512 and service layer 1513). The API 1512 may include specifications for routines, data structures, and object classes. The API 1512 may be either computer-language independent or dependent and refer to a complete interface, a single function, or even a set of APIs. The service layer 1513 provides software services to the computer 1502 or other components (whether or not illustrated) that are communicably coupled to the computer 1502. The functionality of the computer 1502 may be accessible for all service consumers using this service layer. Software services, such as those provided by the service layer 1513, provide reusable, defined functionalities through a defined interface. For example, the interface may be software written in JAVA, C++, or other suitable language providing data in extensible markup language (XML) format or other suitable formats. While illustrated as an integrated component of the computer 1502, alternative implementations may illustrate the API 1512 or the service layer 1513 as stand-alone components in relation to other components of the computer 1502 or other components (whether or not illustrated) that are communicably coupled to the computer 1502. Moreover, any or all parts of the API 1512 or the service layer 1513 may be implemented as child or sub-modules of another software module, enterprise application, or hardware module without departing from the scope of this disclosure.

The computer 1502 includes an interface 1504. Although illustrated as a single interface 1504 in FIG. 15, two or more interfaces 1504 may be used according to particular needs, desires, or particular implementations of the computer 1502. The interface 1504 is used by the computer 1502 for communicating with other systems that are connected to the network 1530 (whether illustrated or not) in a distributed environment. Generally, the interface 1504 includes logic encoded in software or hardware (or a combination of software and hardware) and is operable to communicate with the network 1530. More specifically, the interface 1504 may include software supporting one or more communication protocols associated with communications such that the network 1530 or interface's hardware is operable to communicate physical signals within and outside of the illustrated computer 1502.

The computer 1502 includes a processor 1505. Although illustrated as a single processor 1505 in FIG. 14, two or more processors may be used according to particular needs, desires, or particular implementations of the computer 1502. Generally, the processor 1505 executes instructions and manipulates data to perform the operations of the computer 1502 and any algorithms, methods, functions, processes, flows, and procedures as described in the instant disclosure.

The computer 1502 also includes a database 1506 that can hold data for the computer 1502 or other components (or a combination of both) that can be connected to the network 1530 (whether illustrated or not). For example, database 1506 can be an in-memory, conventional, or other type of database storing data consistent with this disclosure. In some implementations, database 1506 can be a combination of two or more different database types (for example, a hybrid in-memory and conventional database) according to particular needs, desires, or particular implementations of the computer 1502 and the described functionality. Although illustrated as a single database 1506 in FIG. 15, two or more databases (of the same or combination of types) can be used according to particular needs, desires, or particular implementations of the computer 1502 and the described functionality. While database 1506 is illustrated as an integral component of the computer 1502, in alternative implementations, database 1406 can be external to the computer 1402.

The computer 1502 also includes a memory 1507 that can hold data for the computer 1502 or other components (or a combination of both) that can be connected to the network 1530 (whether illustrated or not). For example, memory 1507 can be Random Access Memory (RAM), Read Only Memory (ROM), optical, magnetic, and the like, storing data consistent with this disclosure. In some implementations, memory 1507 can be a combination of two or more different types of memory (for example, a combination of RAM and magnetic storage) according to particular needs, desires, or particular implementations of the computer 1502 and the described functionality. Although illustrated as a single memory 1507 in FIG. 15, two or more memories 1507 (of the same or a combination of types) can be used according to particular needs, desires, or particular implementations of the computer 1502 and the described functionality. While memory 1507 is illustrated as an integral component of the computer 1502, in alternative implementations, memory 1407 can be external to the computer 1502.

The application 1508 is an algorithmic software engine providing functionality according to particular needs, desires, or particular implementations of the computer 1502, particularly with respect to functionality described in this disclosure. For example, application 1508 can serve as one or more components, modules, or applications. Further, although illustrated as a single application 1508, the application 1508 may be implemented as multiple applications 1508 on the computer 1502. In addition, although illustrated as integral to the computer 1502, in alternative implementations, the application 1508 can be external to the computer 1502.

The computer 1502 can also include a power supply 1514. The power supply 1514 can include a rechargeable or non-rechargeable battery that can be configured to be either user- or non-user-replaceable. In some implementations, the power supply 1514 can include power-conversion or management circuits (including recharging, standby, or other power management functionality). In some implementations, the power supply 1514 can include a power plug to allow the computer 1502 to be plugged into a wall socket or other power source to, for example, power the computer 1502 or recharge a rechargeable battery.

There may be any number of computers 1502 associated with, or external to, a computer system containing computer 1502, each computer 1502 communicating over network 1530. Further, the term "client," "user," and other appropriate terminology may be used interchangeably, as appropriate, without departing from the scope of this disclosure. Moreover, this disclosure contemplates that many users may use one computer 1502, or that one user may use multiple computers 1502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a Central Processing Unit (CPU), a Field Programmable Gate Array (FPGA), or an Application-specific Integrated Circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a ROM or a Random Access Memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a Personal Digital Assistant (PDA), a mobile audio or video player, a game console, a Global Positioning System (GPS) receiver, or a portable storage device, for example, a Universal Serial Bus (USB) flash drive, to name just a few.

Computer readable media (transitory or non-transitory, as appropriate) suitable for storing computer program instructions and data includes non-volatile memory, media and memory devices, including by way of example, semiconductor memory devices, for example, Erasable Programmable Read-Only Memory (EPROM), Electrically Erasable Programmable Read-Only Memory (EEPROM), and flash memory devices; magnetic disks, for example, internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a Cathode Ray Tube (CRT), Liquid Crystal Display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back end, middleware, or front end components. The components of the system can be interconnected by any form or medium of wireline or wireless digital data communication (or a combination of data communication), for example, a communication network. Examples of communication networks include a Local Area Network (LAN), a Radio Access Network (RAN), a Metropolitan Area Network (MAN), a Wide Area Network (WAN), Worldwide Interoperability for Microwave Access (WIMAX), a Wireless Local Area Network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method, comprising:

determining, by a terminal device, resources reserved by at least one other terminal device for sidelink transmission, the resources reserved by the at least one other terminal device being a first subset of resources from a resource pool;

determining, by the terminal device, preferred resources for a second terminal device different from the at least one other terminal device based on the resources reserved by the at least one other terminal device and the resource pool, the preferred resources being a second subset of resources from the resource pool, and the second subset of resources having no overlap with the first subset of resources;

transmitting, by the terminal device to the second terminal device, a resource indication message in a second stage of a sidelink control information (SCI) message on a sidelink, wherein the resource indication message indicates the preferred resources, and the preferred resources are provided to the second terminal device for resource selection;

receiving, by the terminal device, an indication of resources selected by the second terminal device, the resources selected by the second terminal device being a subset of the preferred resources; and receiving, by the terminal device, data sent by the second terminal device on the resources selected by the second terminal device based on the resources selected.

2. The method of claim 1, wherein the resource indication message further comprises an indication of a priority level, and wherein the priority level comprises: a priority level of a data packet; or a priority level of a user equipment (UE).

3. The method of claim 1, the determining, by the terminal device, the preferred resources comprising:

determining, by the terminal device, the preferred resources by excluding the resources reserved by the at least one other terminal device from the resource pool.

4. A terminal device, comprising:

at least one processor; and a non-transitory memory storing instructions that, when executed by the at least one processor, cause the terminal device to perform operations including:

determining resources reserved by at least one other terminal device for sidelink transmission, the resources reserved by the at least one other terminal device being a first subset of resources from a resource pool;

determining preferred resources for a second terminal device different from the at least one other terminal device based on the resources reserved by the at least one other terminal device and the resource pool, the preferred resources being a second subset of resources from the resource pool, and the second subset of resources having no overlap with the first subset of resources;

transmitting, to the second terminal device, a resource indication message in a second stage of a sidelink control information (SCI) message on a sidelink, wherein the resource indication message indicates the preferred resources, and the preferred resources are provided to the second terminal device for resource selection;

receiving an indication of resources selected by the second terminal device, the resources selected by the second terminal device being a subset of the preferred resources; and receiving data sent by the second terminal device on the resources selected by the second terminal device based on the resources selected.

5. The terminal device of claim 4, wherein the determining the preferred resources comprises:

determining the preferred resources by excluding the resources reserved by the at least one other terminal device from the resource pool.

6. A non-transitory computer-readable medium having instructions stored thereon that, when executed by a terminal device, cause the terminal device to perform operations, the operations comprising:

determining resources reserved by at least one other terminal device for sidelink transmission, the resources reserved by the at least one other terminal device being a first subset of resources from a resource pool;

determining preferred resources for a second terminal device different from the at least one other terminal device based on the resources reserved by the at least one other terminal device and the resource pool, the preferred resources being a second subset of resources from the resource pool, and the second subset of resources having no overlap with the first subset of resources;

transmitting, to the second terminal device, a resource indication message in a second stage of a sidelink control information (SCI) message on a sidelink, wherein the resource indication message indicates the preferred resources, and the preferred resources are provided to the second terminal device for resource selection;

receiving an indication of resources selected by the second terminal device, the resources selected by the second terminal device being a subset of the preferred resources; and receiving data sent by the second terminal device on the resources selected by the second terminal device based on the resources selected.

7. The non-transitory computer-readable medium of claim 6, wherein the resource indication message further comprises an indication of a priority level, and wherein the priority level comprises: a priority level of a data packet; or a priority level of a user equipment (UE).

8. The non-transitory computer-readable medium of claim 6, the determining the preferred resources comprising:

determining the preferred resources by excluding the resources reserved by the at least one other terminal device from the resource pool.

* * * * *